(12) United States Patent
Kelley et al.

(10) Patent No.: US 6,953,501 B2
(45) Date of Patent: Oct. 11, 2005

(54) WOOD TREATMENT COMPOSITION AND METHOD OF USE

(75) Inventors: David C. Kelley, Angelton, TX (US); Michelle Williamson, Lake Jackson, TX (US); Brad M. Moncla, Lake Jackson, TX (US); Kenneth H. Herbert, Jr., Mt. Pleasant, SC (US)

(73) Assignee: Inventions & Discoveries, LLC, Mt. Pleasant, SC (US)

( * ) Notice: Subject to any disclaimer, the term of this patent is extended or adjusted under 35 U.S.C. 154(b) by 0 days.

(21) Appl. No.: 10/215,103

(22) Filed: Aug. 8, 2002

(65) Prior Publication Data

US 2003/0121445 A1 Jul. 3, 2003

Related U.S. Application Data

(60) Provisional application No. 60/311,643, filed on Aug. 10, 2001.

(51) Int. Cl.$^7$ ............................................... A01N 27/00
(52) U.S. Cl. ............................ 106/15.05; 106/273.1; 106/281.1; 424/78.09; 514/762; 514/772.3
(58) Field of Search ...................... 106/15.05, 273.1, 106/281.1, 16; 424/78.09; 514/762, 772.3

(56) References Cited

U.S. PATENT DOCUMENTS

| | | | |
|---|---|---|---|
| 3,278,377 A | 10/1966 | Ferrucci | |
| 3,389,109 A | 6/1968 | Harmon et al. | |
| 3,436,363 A | 4/1969 | Helin | |
| 3,520,861 A | 7/1970 | Thomson et al. | |
| 3,872,039 A | 3/1975 | Vaughn et al. | |
| 3,899,389 A | 8/1975 | Vaughn et al. | |
| 3,931,448 A | 1/1976 | Parkinson | |
| 3,956,100 A | 5/1976 | Todd | |
| 3,960,969 A | 6/1976 | Greco et al. | |
| 4,143,010 A | 3/1979 | Rak | |
| 4,181,566 A | 1/1980 | Vaughn et al. | |
| 4,234,665 A | * 11/1980 | Johnston ..................... 428/541 | |
| 4,276,329 A | 6/1981 | Vasishth et al. | |
| 4,313,012 A | 1/1982 | Burkitt | |
| 4,420,542 A | 12/1983 | Sowers | |
| 4,433,031 A | 2/1984 | Allen, Sr. | |
| 4,599,392 A | 7/1986 | McKinney et al. | |
| 4,656,060 A | 4/1987 | Krzyzewski | |
| 4,729,832 A | 3/1988 | Leonard et al. | |
| 4,737,491 A | 4/1988 | Leppavuori et al. | |
| 4,778,833 A | 10/1988 | Van der Drift et al. | |
| 4,988,576 A | 1/1991 | Lin et al. | |
| 4,988,781 A | 1/1991 | McKinney et al. | |
| 5,055,438 A | 10/1991 | Canich | |
| 5,057,475 A | 10/1991 | Canich et al. | |
| 5,064,802 A | 11/1991 | Stevens et al. | |
| 5,096,867 A | 3/1992 | Canich | |
| 5,098,472 A | 3/1992 | Watkins et al. | |
| 5,132,380 A | 7/1992 | Stevens et al. | |
| 5,189,192 A | 2/1993 | LaPointe et al. | |
| 5,206,279 A | 4/1993 | Rowland et al. | |
| 5,246,739 A | 9/1993 | Lin | |
| 5,272,236 A | 12/1993 | Lai et al. | |
| 5,321,106 A | 6/1994 | LaPointe | |
| 5,347,024 A | 9/1994 | Nickias et al. | |
| 5,350,723 A | 9/1994 | Neithamer et al. | |
| 5,374,696 A | 12/1994 | Rosen et al. | |
| 5,384,373 A | 1/1995 | McKinney et al. | |
| 5,387,635 A | 2/1995 | Rowland et al. | |
| 5,399,635 A | 3/1995 | Neithamer et al. | |
| 5,460,751 A | 10/1995 | Ma et al. | |
| 5,470,993 A | 11/1995 | Devore et al. | |
| 5,506,001 A | 4/1996 | Ma et al. | |
| 5,549,869 A | * 8/1996 | Iwakawa ..................... 422/40 |
| 5,609,295 A | 3/1997 | Richards | |
| 5,703,187 A | 12/1997 | Timmers | |
| 5,721,185 A | 2/1998 | LaPointe et al. | |
| 5,804,641 A | * 9/1998 | Iwakawa ..................... 524/507 |
| 6,237,305 B1 | 5/2001 | Landers | |
| 6,316,016 B1 | * 11/2001 | Iwakawa ..................... 424/409 |
| 6,344,515 B1 | 2/2002 | Parikh et al. | |
| 2002/0001606 A1 | * 1/2002 | Subbaraman et al. ........ 424/413 |

FOREIGN PATENT DOCUMENTS

| | | |
|---|---|---|
| CA | 907232 | 8/1972 |
| EP | 0 416 815 A2 | 3/1991 |
| EP | 0 514 828 A1 | 11/1992 |
| GB | 1354298 | 5/1974 |
| GB | 1354298 A * | 5/1974 |
| GB | 1573395 A * | 8/1980 |
| JP | 54-26308 A * | 2/1979 |
| JP | 09-117905 | 5/1997 |
| NL | 9001103 | 12/1991 |
| WO | WO 85/00040 A1 | 1/1985 |
| WO | WO 97/22754 | 6/1997 |
| WO | WO 98/03731 | 1/1998 |
| WO | WO 01/01776 A1 | 1/2001 |

OTHER PUBLICATIONS

Search, Report, Nov. 6, 2002.

* cited by examiner

Primary Examiner—Anthony J. Green

(57) ABSTRACT

A wood treatment composition for the preservation of wood comprises a mixture of creosote and a polymer which is miscible with the creosote at about 200° F. and does not substantially phase-separate when the wood treatment composition is under ambient conditions. The polymer may include, but is not limited to, ethylene vinyl acetate copolymers, ethylene methyl acrylate copolymers, ethylene ethyl acrylate copolymers, ethylene butyl acrylate copolymers, ethylene acrylic acid copolymers, ethylene methacrylic acid copolymers, ethylene methyl methacrylic acid copolymers, ethylene styrene interpolymers, styrene acrylic acid copolymers, styrene methacrylic acid copolymers, styrene methyl acrylate copolymers, styrene butadiene styrene block copolymers, styrene ethylene butylene styrene block copolymers, or a blend thereof. Preferably, the creosote is present in an amount of at least 50 percent by weight of the composition. Such compositions can be used to treat wood surfaces to prolong the service life of the wood.

11 Claims, 12 Drawing Sheets

WOOD TREATMENT COMPOSITION AND METHOD OF USE

CROSS REFERENCE TO RELATED APPLICATIONS

This patent application claims priority to U.S. Provisional Application Serial No. 60/311,643, filed on Aug. 10, 2001, which is incorporated by reference herein in its entirety.

FEDERALLY SPONSORED RESEARCH

Not applicable.

REFERENCE TO MICROFICHE APPENDIX

Not applicable.

FIELD OF THE INVENTION

The invention relates to a composition and method of treating wood to prolong its service life. More particularly, the invention relates to a creosote-based composition and method for treating and preserving wood products.

BACKGROUND OF THE INVENTION

In the United States and many other countries possessed of abundant timber resources, wood has always been an important construction material. Its good availability, low heat conductivity, and sound-deadening qualities, have made it an outstanding building material since early human history.

Rail transportation of freight and passenger cars is an important part of the world's infrastructure. This is especially true in heavily urban areas in North America and Europe and also in large geographical areas, such as the United States and Canada. Most cities in developed countries of the world contain hundreds, if not thousands, of miles of railway track. Indeed, a large and developed country, such as the United States, might contain several hundred thousand miles of railway track, including main lines, marshalling yards, commuter lines, and so on.

Most types of railway tracks are supported on a plurality of individual ties spaced one from another along the length of the railway track. The ties are typically about two and one-half meters long and about fifteen to twenty centimeters in width and thickness. The rails are secured to the ties in any one of a variety of ways, such as by means of large spikes, or by means of specially designed clips engaging co-operating clip receiving members embedded in the ties. The ties keep the rails spaced apart at a predetermined distance. The ties are further designed to carry the static and dynamic loads of freight and passenger trains traveling at various speeds, including relatively high speeds, perhaps well in excess of one hundred miles per hour. Such ties include wood ties, concrete ties, plastic encapsulated wood ties, plastic composite ties, and steel ties.

The most common type of railway tie is a conventional wood tie. Wood railway ties are the preferred railway ties in North America, for instance, since they can stand climatic change and are relatively low cost to purchase and initially install, when compared to other types of railway ties. In use, wood railway ties are supported and somewhat surrounded by a compacted granular bed known as ballast. The ties tend to shift in the ballast bed, due to the extreme dynamic loading on the railroad track by a passing train. Wood railway ties therefore require routine maintenance in order to ensure that they are properly supporting the railway track rails. Also, the ballast bed requires consistent and regular maintenance in order to keep the individual pieces of ballast in place.

Because wood is a cellulosic material, it is susceptible to decay and deterioration over any extended period of time. Decay is, in part, due to biological attacks by microorganisms (such as fungi and bacteria), marine borers, and insects. Much of the decay of wood in service is inevitable. It is particularly severe as a result of the activities of low forms of plants known as wood-destroying fungi. This type of fungi often causes extensive damage and financial loss to buildings.

The conditions necessary for the development of decay-producing fungi in wood are: (1) a supply of suitable wood, (2) a sufficient amount of moisture, (3) at least a small amount of air, and (4) a favorable temperature. A deficiency in any of these requirements may inhibit the growth of a fungus and may reduce the decay of wood. Under normal service conditions of wood, the deficiency is difficult to maintain. Therefore, various techniques of wood preservation have been developed, including surface coating, surface treating, and pressure penetration of the wood with a variety of wood preservatives. There are generally two types of wood preservatives: oil-borne preservatives and water-borne preservatives. Oil-borne preservatives include, for example, creosote, pentachlorophenol, copper naphthenate, zinc naphthenate, copper-8-quinolinolate, and others. Important water-borne preservatives are arsenic salts, boric acid, chromium salts, chromated zinc chloride, copper sulfate, mercuric chloride, sodium pentachlorophenate, zinc sulfate, chromated copper arsenate, etc.

Creosote has been used for decades to treat wood railway ties in order to protect the wood railway ties from insects, rotting, and so on. Generally, creosote-treated wood railway ties last about 30 years in northern climates. But their life is shortened to about 15 years at the longest in southern climates. As a general rule, the further south, the shorter the life expectancy for creosote-treated wood railway ties. This is due to the relatively high humidity and temperatures in the southern climates. For these reasons, there is need for a creosote-based wood treatment composition which would prolong the useful life of a wood product, especially in a southern climate.

SUMMARY OF THE INVENTION

The aforementioned need is fulfilled by one or more aspects of the invention disclosed herein. In one aspect, the invention relates to a wood treatment composition and a method of making and using the composition. The wood treatment composition comprises a mixture of creosote and one or more thermoplastic polymers. A suitable thermoplastic polymer includes any polymer which is miscible with the creosote at about 200° F. and does not substantially phase-separate when the wood treatment composition is under ambient conditions.

In another aspect the invention provides a composition comprising a mixture of a creosote and a thermoplastic polymer having polycyclic aromatic compounds therein, the crystallization temperature of polycyclic aromatic compounds in the creosote before mixing with a suitable polymer being higher than the crystallization temperature the polycyclic aromatic compounds after mixing with the polymer.

Exemplary suitable thermoplastic polymers of some embodiments include, but are not limited to, ethylene vinyl acetate copolymers, ethylene methyl acrylate copolymers, ethylene ethyl acrylate copolymers, ethylene butyl acrylate copolymers, ethylene acrylic acid copolymers, ethylene methyl methacrylate copolymers, ethylene methyl methacrylic acid copolymer, ethylene styrene interpolymers, styrene acrylic acid copolymers, styrene methacrylic acid copolymers; styrene methyl acrylate copolymers, styrene butadiene styrene block copolymers, styrene ethylene butylene styrene block copolymers, or a blend thereof. Preferably, the creosote is present in an amount of at least 50 percent by weight of the composition.

DESCRIPTION OF EMBODIMENTS OF THE INVENTION

Figure 1:
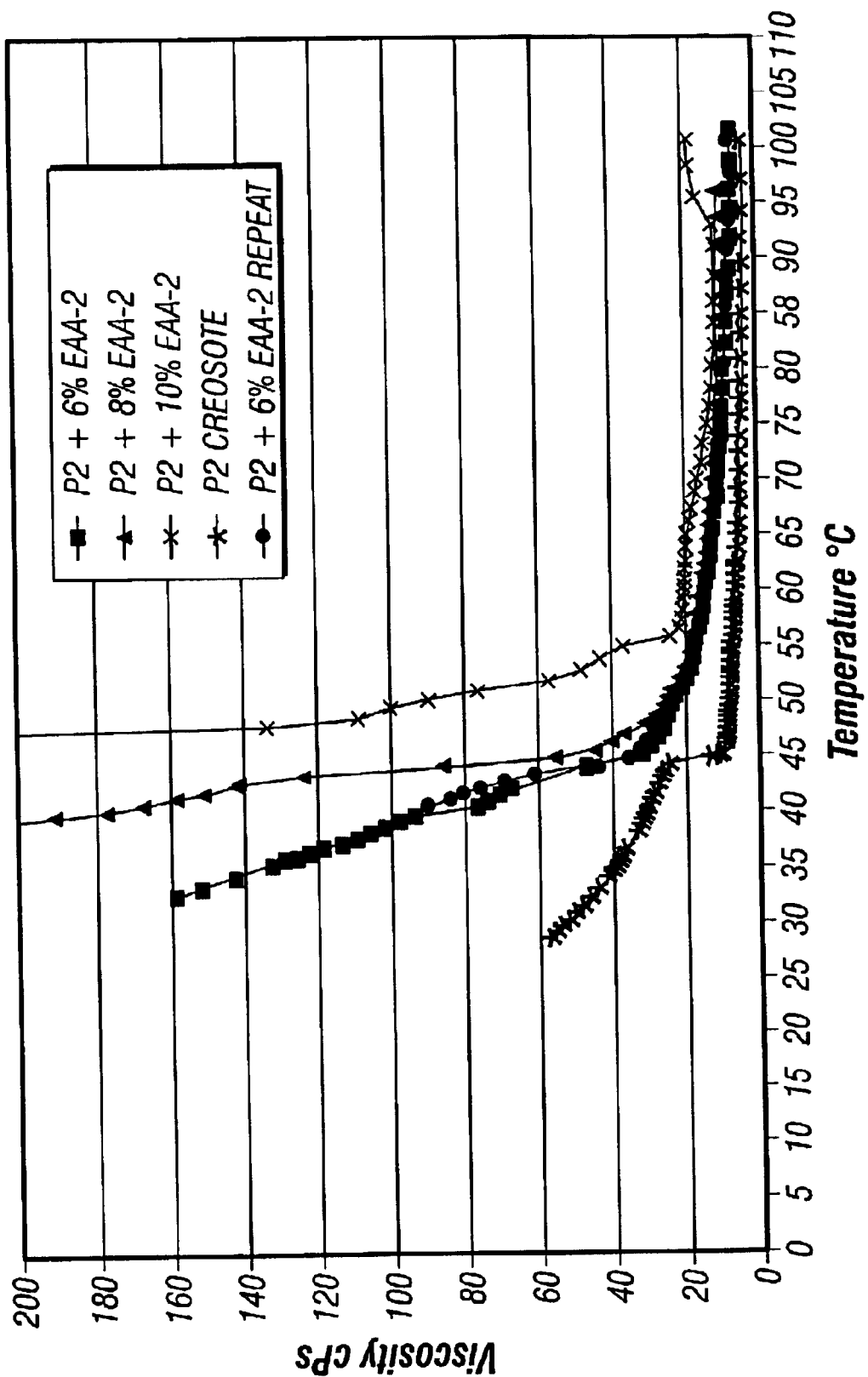
FIG. 1 shows viscosity curves as a function of temperature for various creosote-based compositions.

Embodiments of the invention provide a wood treatment composition and a method of treating wood by such a composition, as well as a wood product treated by the composition. The wood treatment composition comprises a mixture of creosote and a thermoplastic polymer (or a blend of thermoplastic polymers) which is miscible with the creosote at about 200° F. and does not substantially phase-separate when the wood treatment composition is under ambient conditions.

Any polymer which is miscible with the creosote at about 200° F. and does not substantially phase-separate when the wood treatment composition is under ambient conditions can be used. In some embodiments, the thermoplastic polymer is a copolymer of ethylene and one or more polymerizable monomers. Suitable copolymers include, but are not limited to, ethylene vinyl acetate copolymers ("EVA"), ethylene methyl acrylate copolymers, ethylene ethyl acrylate copolymers ("EEA"), ethylene butyl acrylate copolymers ("EBA"), ethylene acrylic acid copolymers ("EAA"), ethylene methyl methacrylic acid copolymers ("EMAA"), ethylene styrene interpolymers ("ESI"), styrene acrylic acid copolymers ("SAA"), styrene methacrylic acid copolymers, styrene methyl acrylate copolymers ("SMA"), styrene butadiene styrene block copolymer ("SBS"), styrene ethylene butylene styrene block copolymers ("SEBS"), or a blend thereof.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, 100 percent. Moreover, any numerical range defined by two R numbers as defined in the above is also specifically disclosed.

The creosote may be present in the wood treatment composition in any amount, such as from about 1 wt. percent to about 99 wt. percent. Preferably, the creosote is present in an amount of at least 50 percent by weight of the composition. The wood product obtained in accordance with the embodiments of the invention comprises a piece of wood having at least one surface coated or penetrated by a treatment composition comprising a mixture of creosote and a polymer which is miscible with the creosote at about 200° F. and does not substantially phase-separate when the composition is under ambient conditions.

Creosote is a complex mixture of many chemicals. There are mainly three kinds of creosote. One type results from high temperature treatment of coal, i.e., coal tar creosote; another type results from high temperature treatment of beech and other woods, i.e., beech wood creosote; still another type comes from the resin of the creosote bush, i.e., creosote bush resins. Other forms of creosote are known in the art.

Coal tar creosote is a common form of creosote which is obtained from the distillation of coal. Coal tar creosote includes liquid and solid aromatic hydrocarbons as its principal components. One definition of creosote is that it includes the 200° C.–400° C. boiling fraction of the distillate produced by high-temperature carbonization of bituminous coal. The main constituents of coal tar creosote have been classified by W. P. K. Findlay in "Preservation of Timber," Adams & Charles Black, London, 1962 as (1) tar acids, such as phenol, cresol, xylenol, etc., and (2) tar bases, such as pyridine, quinoline, and acridine; and (3) neutral oils, such as a mixture of naphthalene, anthracene, and other neutral hydrocarbons.

When coal tar is distilled, creosote is produced from the fraction boiling between about 200° and about 400° C., which may further be separated into light creosote and heavy creosote. Light creosote is generally considered as a material with 80 wt. percent boiling between about 235° C. and about 355° C. of which 50–80 wt. percent boils between 315° C. and 355° C. The remaining 20 wt. percent of the total boils higher than 355° C. Heavy creosote is considered as a material with 50 wt. percent boiling between 270° C. and 355° C. and 50 wt. percent boiling only above 355° C. Sometimes, creosote is classified as low temperature creosote, high temperature creosote and medium temperature creosote. Table I below shows the typical composition for coal tar creosote. It should be understood that Table I does not include all the components, and it is merely illustrative of a typical creosote composition and should not be construed to limit the type of creosote suitable for embodiments of the invention. Both the upper and lower limits are not absolute. Creosote which deviates in composition from that of Table I may also be used in embodiments of the invention. In other words, suitable creosote need not include all of the listed components. One or more of the listed components may be absent in suitable creosote. Similarly, one or more unlisted components may be present in suitable creosote.

TABLE I

Typical Creosote Composition

| Component | Averages | Upper Limit | Lower Limit |
|---|---|---|---|
| Benzene | 0.01 | 0.03 | 0.00 |
| Toluene | 0.02 | 0.05 | 0.00 |
| Ethylbenzene | 0.02 | 0.04 | 0.00 |
| M-Xylene | 0.01 | 0.02 | 0.00 |
| P-Xylene | 0.01 | 0.02 | 0.00 |
| O-Xylene | 0.01 | 0.02 | 0.00 |
| Phenol | 0.01 | 0.03 | 0.00 |
| Coumarone (Benzofuran) | 0.04 | 0.10 | 0.00 |
| Indan | 0.16 | 0.28 | 0.00 |
| Indene | 0.06 | 0.13 | 0.00 |
| Creosols | 0.09 | 0.25 | 0.00 |
| Naphthalene | 4.41 | 7.51 | 1.31 |
| Benzothiophene | 0.13 | 0.18 | 0.09 |
| Quinoline | 1.30 | 2.02 | 0.58 |
| Isoquinoline | 0.30 | 0.48 | 0.13 |
| 2-Methylnaphthalene | 7.04 | 11.09 | 2.99 |
| 2-Methylbenzo[b]thiophene | 0.22 | 0.35 | 0.09 |
| 1-Methylnaphthalene | 2.62 | 4.10 | 1.14 |
| Diphenyl | 1.42 | 2.24 | 0.61 |
| Acenaphthylene | 0.17 | 0.25 | 0.08 |
| Acenaphthene | 7.82 | 9.92 | 5.71 |

TABLE I-continued

Typical Creosote Composition

| Component | Averages | Upper Limit | Lower Limit |
|---|---|---|---|
| Dibenzofuran | 4.08 | 5.76 | 2.40 |
| Fluorene | 5.56 | 7.23 | 3.88 |
| Dibenzothiophene | 1.07 | 1.12 | 1.03 |
| Phenanthrene | 14.72 | 15.73 | 13.72 |
| Anthracene | 3.85 | 4.52 | 3.18 |
| Dibenzopyrrole (Carbazole) | 1.83 | 1.97 | 1.70 |
| Cyclopentaphenanthrene | 1.55 | 1.95 | 1.15 |
| Fluoranthene | 7.40 | 10.03 | 4.77 |
| Pyrene | 5.90 | 8.13 | 3.66 |
| 11H-Benzo(b)fluorene | 0.92 | 1.31 | 0.54 |
| 11H-Benzo(a)fluorene | 0.90 | 1.27 | 0.52 |
| Benz(a)anthracene | 1.60 | 2.28 | 0.92 |
| Chrysene | 1.46 | 2.02 | 0.90 |
| Benzo fluoranthenes | 1.25 | 1.74 | 0.76 |
| Benzo(e)pyrene | 0.45 | 0.60 | 0.30 |
| Benzo(a)pyrene | 0.47 | 0.67 | 0.27 |

Any creosote may be used in embodiments of the invention. It includes, but is not limited to, coal tar creosote, beechwood creosote, creosote bush resins, and any other forms of creosote known in the art. Examples of conventional coal tar creosote are American Wood-Preservers Association Standard Creosote P2, P-65, P7-72, P13-65, and P1/P13-95. These standard creosotes are also cited in the United States Federal Standards TT-C-645, and TT-C-655 (1)1. Table II shows American Wood-Preservers Association Standard Creosote P1/P13-95, which is a standard for coal tar creosote for land, fresh water and marine (coastal waters) use, and P2-98, which is the standard for creosote solutions. All of these forms of creosote may be used in embodiments of the invention. These standards merely illustrate suitable types of creosote. Creosote which deviates from the standards may also be used.

TABLE II

P1/P13-95 Standard For Coal Tar Creosote

1. The creosote shall be a distillate derived entirely from tar produced by the carbonization of bituminous coal.
2. The new material and the material in use in treating solutions shall conform to the following detailed requirements.

| | New Material | | Material Not in Use | |
|---|---|---|---|---|
| | Not Less Than | Not More Than | Not Less Than | Not More Than |
| 2.1 Water, percent by Volume | — | 1.5 | — | 3.0 |
| 2.2 Matter Insoluble in Xylene, % by wt. | — | 0.5 | — | 1.5 |
| 2.3 Specific Gravity at 38° C. Compared to water at 15.5° C. | | | | |
| Whole Creosote | 1.070 | — | 1.070 | — |
| Fraction 235–315° C. | 1.028 | — | 1.028 | — |
| Fraction 315–355° C. | 1.100 | — | 1.100 | — |
| 2.4 Distillation: The distillate, % by wt. on a water free basis, shall be within the following limits: | | | | |
| Up to 210° C. | — | 2.0 | — | 2.0 |
| Up to 235° C. | — | 12.0 | — | 12.0 |
| Up to 270° C. | 10.0 | 40.0 | 10.0 | 40.0 |
| Up to 315° C. | 40.0 | 65.0 | 40.0 | 65.0 |
| Up to 355° C. | 65.0 | 77.0 | 65.0 | 77.0 |

3.0 Tests to establish conformance with the foregoing requirements of the American Wood-Preservers' Association. (See Standard A1.)

TABLE II-continued

P2-98 Standard For Creosote Solutions

1. The creosote shall be a distillate derived entirely from tar produced by the carbonization of bituminous coal. It may either be a coal tar distillate or a solution of coal tar in coal tar distillate.
2. The new material and the material in use in treating solutions shall conform to the following detailed requiements.

|  | New Material | | Material Not in Use | |
| --- | --- | --- | --- | --- |
|  | Not Less Than | Not More Than | Not Less Than | Not More Than |
| 2.1 Water, % by Volume | — | 1.5 | — | 3.0 |
| 2.2 Matter Insoluble in Xylene, % by wt. | — | 3.5 | — | 4.5 |
| 2.3 Specific Gravity at 38° C. Compared to water at 15.5° C. | | | | |
| Whole Creosote | 1.080 | 1.130 | 1.080 | 1.130 |
| Fraction 235–315° C. | 1.025 | — | 1.025 | — |
| Fraction 315–355° C. | 1.085 | — | 1.085 | — |
| 2.4 Distillation: The distillate, % by wt. on a water free basis, shall be within the following limits: | | | | |
| Up to 210° C. | — | 5.0 | — | 5.0 |
| Up to 235° C. | — | 25.0 | — | 25.0 |
| Up to 315° C. | 32.0 | — | 32.0 | — |
| Up to 355° C. | 52.0 | — | 52.0 | — |

3.0 Tests to establish conformance with the foregoing requirements shall be made in accordance with the standard methods of the American Wood-Preservers' Association. (See Standard A1.)

*Standard P1/P13-95 was reaffirmed in 1995 with minor editorial corrections.
*Standard P2 was reaffirmed in 1995 with minor editorial corrections and amended in 1998.

Suitable creosote also includes those which have been subjected to heating, aeration or refluxing. U.S. Pat. No. 3,956,100 discloses an improved creosote composition obtained by subjecting a conventional coal tar creosote to a mild hydrogenation reaction to reduce the aromaticity index. The resulting creosote obtained by the disclosed process may also be used in embodiments of the invention. Moreover, the creosote described in U.S. Pat. No. 3,960,969 and U.S. Pat. No. 4,313,012 may also be used in embodiments of the invention. All of the preceding U.S. Patents are incorporated by reference herein in their entirety.

Additional suitable form of creosote is emulsified creosote or creosote emulsion. The emulsion can be water-in-oil or oil-in-water, depending on the proportions of the components present in the emulsion. Suitable emulsifiers include, but are not limited to, silicones, amines, fatty acids, fatty acid residues, ethoxylated amines, soaps, detergents, alkanates, sodium lauryl sulfates, nonyl phenol ethoxylates, octyl phenol ethoxylates, cetyl stearyl alcohol ethoxylates, propylene glycol ethoxylates, alkyl aryl ethers, ethylene oxide condensates and sulfonates. U.S. Pat. No. 5,098,472 discloses various creosote emulsions which may be used in embodiments of the invention. The disclosure of the patent is incorporated by reference herein in its entirety.

The wood treatment is formulated by mixing or blending creosote with a polymer which is miscible with the creosote at a temperature from about 150° to about 250° F. In some embodiments, the polymer added to the creosote is substantially free of a solvent. As used herein the term "substantially free of solvent" means that the polymer contains less than 10 percent solvent therein when added to the creosote. In some embodiments, the polymer is "essentially free of solvent," meaning that solvent is present as an impurity, at levels associated with residuals of polymer processing methods. Upon cooling to room temperature, there preferably should not be substantial phase separation between the creosote and the polymer. A polymer is miscible with creosote when it dissolves in creosote or forms a homogenous or substantially homogenous mixture with creosote at the macroscopic level. This means that some microscopic phase separation may exist even though macroscopic homogeneity is obtained. One way to determine macroscopic homogeneity is by visual inspection with the unaided eye. In formulating a homogeneous mixture, complete solubility, although desirable, is not required. Slight or minor phase separation is acceptable.

One method to quantify the miscibility of two substances is to use Hildebrand's solubility parameter which is a measure of the total forces holding the molecules of a solid or liquid together. Each polymer (or other material) is characterized by a specific value of solubility parameter, although it is not always available. Substances with similar solubility parameter values tend to be miscible. On the other hand, those with significantly different solubility parameters tend to be immiscible, although there are many exceptions to this general rule. Discussions of solubility parameter concepts are presented in (1) *Encyclopedia of Polymer Science and Technology*, Interscience, New York (1965), Vol. 3, pg. 833; (2) *Encyclopedia of Chemical Technology*, Interscience, New York (1971), Supp. Vol., pg. 889; and (3) *Polymer Handbook,* 3rd Ed., J. Brandup and E. H. Immergut (Eds.), (1989), John Wiley & Sons "Solubility Parameter Values," pp. VII-519, which are incorporated by referenced in their entirety herein in their entirety.

As mentioned above, any polymer which is miscible with creosote at an elevated temperature, such as about 200° F. and does not phase-separate or substantially phase-separate when the resulting mixture is under ambient conditions may be used in embodiments of the invention. Ambient conditions refer to room temperature and pressure, which may vary from location to location. The term "polymer" refers to homopolymers, copolymers, terpolymers, tetrapolymers, ionomers, etc. Preferably, ethylene-based or styrene-based copolymers are used. Examples of these polymers include, but are not limited to, ethylene vinyl acetate copolymers, ethylene methacrylic acid copolymers, ethylene methyl acrylate copolymers, ethylene ethyl acrylate copolymers, ethylene butyl acrylate copolymers, ethylene styrene interpolymers, styrene acrylic acid copolymers, ethylene acrylic acid copolymers, ethylene methyl methacrylic acid copolymers, styrene acrylic acid copolymers, styrene methyl acrylate copolymers, styrene methacrylic acid copolymers, styrene butadiene styrene block copolymers, and styrene ethylene butylene styrene block terpolymers, etc. Other thermoplastic polymers, homopolymers or copolymers of polypropylene, such as atactic polypropylene may also be used so long as they dissolve or are miscible with creosote around 200° F.

In some embodiments, the molecular weight of the polymer added to creosote preferably should be relatively low so that the viscosity of the resulting mixture at the treating temperature (e.g., about 200° F.) is not significantly different from the viscosity of creosote at the treating temperature. Preferably, the viscosity changes due to the addition of a polymer to creosote should not be greater than 100 percent. In some cases, the viscosity changes are less than about 75 percent, 50 percent, 30 percent, 20 percent, or 10 percent.

A wood treatment composition may be made by first melting a polymer and then adding the melted polymer to liquid creosote at an elevated temperature in the range from about 150° F. to about 250° F. In this method, because a suitable polymer is added as a melt to liquid creosote, a crystalline polymer preferably should have a melting point below about 250° F., more preferably below about 210° F., and most preferably below 200° F. In some embodiments, the melting point of a crystalline polymer is less than 150° F. or 100° F. If an amorphous polymer is used, the amorphous polymer preferably should have a glass transition temperature, $T_g$, below about 250° F., more preferably below about 210° F., and most preferably below 200° F. In some embodiments, the glass transition temperature of an amorphous polymer is less than 150° F. or 100° F.

As mentioned above, the molecular weight of a suitable polymer preferably should be relatively low so that it does not substantially alter the viscosity of creosote. The molecular weight of a polymer can be conveniently measured by gel permeation chromatography as described in U.S. Pat. No. 5,272,236, which is incorporated by reference herein in its entirety. For ethylene polymers or interpolymers, one method to determine the molecular weight is to measure the melt index according to ASTM D-1238 condition 190° C./2.16 kg (formerly known as condition "E" and also known as "$I_2$"). Generally, melt index $I_2$ is inversely proportional to the molecular weight of an ethylene polymer. The higher the molecular weight, the lower the melt index $I_2$, although the relationship is not necessarily linear. Another measurement in characterizing the molecular weight of ethylene polymers involves measuring the melt index with a higher weight in accordance with ASTM D-1238 condition 190° C./10 kg (formerly known as condition "N" and also known as "$I_{10}$"). Similarly, melt index $I_{10}$ is inversely proportional to the molecular weight of an ethylene polymer. Preferably, the melt index $I_2$ of a suitable polymer should be greater than about 50 g/10 min., more preferably about 100 g/10 min. or 200 g/10 min., and most preferably greater than about 300 g/10 min. In some embodiments, a polymer with a melt index $I_2$ exceeding about 500 g/10 min. or 1000 g/10 min. is added to creosote to formulate a wood treatment composition. In other embodiments, the melt index $I_2$ of a suitable polymer ranges from about 100 to about 5000 g/10 min., preferably from about 500 to about 5000 g/10 min., and more preferably from about 1000 to about 1500 g/10 min.

Any amount of polymer may be present in a wood treatment composition so long as the polymer does not substantially phase-separate under ambient conditions, i.e., a polymer may be present from about 1 wt. percent to about 99 wt. percent. To be economical, the wood treatment composition should predominantly be composed of creosote because creosote is relatively inexpensive. Preferably, creosote is present in the wood treatment composition by at least 50 percent by weight, although a lower amount, such as 40 percent, 30 percent or 25 percent, may also be acceptable. In some embodiments, creosote is present in the wood treatment composition by at least 60 percent, 70 percent, 80 percent or 90 percent. Preferably, the polymer may be present in the range of about 1 percent to about 20 percent by weight of the wood treatment composition, more preferably about 5 percent to about 12 percent by weight, and most preferably from about 6 percent to about 10 percent by weight. In addition to creosote and one or more polymers, a wood treatment composition may further include one or more additives, such as an antioxidant, a UV inhibitor, an anti-microbial agent, an anti-fungal agent, a pesticide, or a mixture thereof. Specifically, pentachlorophenol, copper naphthenate, zinc naphthenate, copper-8-quinolinolate, arsenic salts, boric acid, borates, chromium salts, chromated zinc chloride, copper sulfate, mercuric chloride, sodium pentachlorophenate, zinc sulfate, chromated copper arsenate, etc. may be used. Additional additives are those known in the art. These additives may be present in an effective amount in the wood treatment composition.

In some embodiments, a wood treatment composition consists essentially of a mixture of creosote and a copolymer selected from ethylene vinyl acetate copolymers, ethylene methyl acrylate copolymers, ethylene ethyl acrylate copolymers, ethylene butyl acrylate copolymers, ethylene styrene interpolymers, styrene acrylic acid copolymers, ethylene acrylic acid copolymers, ethylene methacrylic acid copolymers, ethylene methyl methacrylic acid copolymers, styrene methacrylic acid, styrene methyl acrylate copolymers, styrene butadiene styrene block copolymers, styrene ethylene butylene styrene block copolymers, or a blend thereof. Preferably, the creosote is present by at least 50 wt. percent of the wood treatment composition. In these embodiments, the wood treatment composition is substantially free of other polymers or chemicals not mentioned herein. However, the wood treatment composition may include one or more additives which do not materially alter the functions of the wood treatment composition. Suitable additives include, but are not limited to, fillers, viscosity modifiers, antioxidants, UV inhibitors, antimicrobial agents, anti-fungal agents, pesticides, or mixtures thereof.

In other embodiments, the thermoplastic polymer has an affinity for the polycyclic aromatic compounds (PACs) in the creosote such that the polymer substantially prevents the crystallization of the PACs. One example of such polymers is ethylene/vinyl aromatic copolymer described below. In these embodiments, the average domain size of the PACs after the polymer is mixed with a creosote should be less than about 100 microns, preferably less than about 50 microns, less than about 30 microns, or less than about 15 microns. Average domain size can be measured by scanning electron microscopy, atomic force microscopy, hot stage microscopy or any other technique.

In such embodiments, a new polymer-modified creosote composition is provided. The composition comprises a mixture of a creosote having polycyclic aromatic compounds therein and a thermoplastic polymer, the polycyclic aromatic compounds having a crystallization temperature $T_1$ in the creosote before the thermoplastic polymer is added and a crystallization temperature $T_2$ in the mixture after the thermoplastic polymer is added, wherein $T_1$ is greater than $T_2$. The fact that the crystallization temperature changes after the polymer is added to creosote indicates that the polymer has affinity for the PACs in the creosote. On the other hand, if there is no change in the crystallization temperature after a polymer is added to a creosote, the polymer does not have affinity or has very little affinity for the PACs in the creosote. In some preferred embodiments, the crystallization temperature of the polymer (if crystalline or semicrystalline) or the glass transition temperature of the polymer (if amorphous) is decreased after being added to the creosote.

One class of suitable copolymers are interpolymers of olefin and ethylenically unsaturated carboxylic acid monomers. Suitable olefins include, but are not limited to, ethylene, propylene, 1-butene, isobutene, butadiene, isoprene, styrene, α-methyl styrene, toluene, t-butyl styrene, etc. Suitable ethylenically unsaturated carboxylic acid monomers preferably have three to eight carbon atoms per molecule, including anhydrides, alkyl esters, half esters, etc. Examples of ethylenically unsaturated carboxylic acids include, but are not limited to, acrylic acid, methacrylic acid, maleic acid and anhydride, itaconic acid, fumaric acid, crotonic acid, citraconic acid and anhydride, methyl hydrogen maleate, ethyl hydrogen maleate, etc. In addition, other ethylenically unsaturated monomers which are not entirely hydrocarbon may also be used to make the interpolymers. Examples of such monomers include, but are not limited to, esters of ethylenically unsaturated carboxylic acid, such as ethyl acrylate, methyl methacrylate, ethyl methacrylate, methyl acrylate, isobutyl acrylate, and methyl fumarate. They may also include unsaturated esters of non-polymerizable carboxylic acid, such as vinyl acetate, vinyl propionate, vinyl benzoate, and vinyl halides, such as vinyl and vinylidene chloride, vinyl esters, ethylenically unsaturated amides and nitriles, such as acrylamide, acrylonitrile, methacrylonitrile, and fumaronitrile.

The olefin monomers should be present in the interpolymer in an amount from about 60 percent to about 90 percent by weight. The ethylenically unsaturated carboxylic acid monomers should be present in the interpolymer from about 5 percent to about 25 percent by weight. Another type of ethylenically unsaturated carboxylic acid monomers may be present from 0 to about 20 wt. percent in the interpolymer. The aforementioned interpolymers may be prepared by the methods and procedures as described in U.S. Pat. No. 3,436,363; U.S. Pat. No. 3,520,861; U.S. Pat. No. 4,599,392; and U.S. Pat. No. 4,988,781. The disclosures of these patents are incorporated by reference herein in their entirety. One skilled in the art recognizes that the characteristics of such polymers may be tailored by adjusting various parameters, such are reaction time, temperature and pressure, of a polymerization method or procedure. One parameter that may be adjusted to control the melt index of a polymer is the hydrogen concentration. Higher hydrogen concentrations tend to produce polymers with higher melt indices, although the relationship is not necessarily linear.

Suitable interpolymers can also be made from preformed, non-acid polymers by subsequent chemical reactions carried out thereon. For example, the carboxylic acid group may be supplied by grafting a monomer such as acrylic acid or maleic acid onto a polymer substrate such as ethylene. Additionally, interpolymers containing carboxylic anhydride, ester, amide, acylhalide, and nitrile groups can be hydrolyzed to carboxylic acid groups. Furthermore, the interpolymers may be further modified by the method described in U.S. Pat. No. 5,384,373, which is incorporated by reference herein in its entirety. The resulting modified interpolymer may also be used in embodiments of the invention.

In some embodiments, a suitable polymer is used as an aqueous dispersion. The aqueous dispersion is mixed with creosote at room temperature. The mixture is subsequently heated under agitation to a temperature from about 150° F. to about 250° F. After a sufficient period of time, a relatively homogenous mixture is obtained. Additional additives may be added to the mixture, if desired. Many methods are known in the art for making aqueous polymer dispersions. For example, dispersions of interpolymers of olefin/ ethylenically unsaturated carboxylic acids may be obtained according to U.S. Pat. No. 3,389,109; U.S. Pat. No. 3,872, 039; U.S. Pat. No. 3,899,389; U.S. Pat. No. 4,181,566; U.S. Pat. No. 5,206,279; and U.S. Pat. No. 5,387,635. The disclosures of all of the preceding patents are incorporated by reference herein in their entirety.

A preferred polymer used to formulate a wood treatment composition in accordance with embodiments of the invention is a copolymer of ethylene and acrylic acid, i.e., ethylene acrylic acid copolymer or interpolymer (EAA). The acrylic acid level in the copolymer may range from about 1 wt. percent to about 30 wt. percent, although other ranges may also be acceptable. In some embodiments, the acrylic acid is between about 10 to about 20 wt. percent. The melt index $I_2$ is preferably about 100 g/10 min. or higher. The melting point is typically less than about 190° F. Such ethylene acrylic acid copolymer is available from The Dow Chemical Company, E. I. duPont DeNemours (under the trademark NUCREL) and EXXON-Mobil (under the trademark ESCOR). For example ethylene/acrylic acid copolymers having melt indices of from about 300 to 1300 grams/ 10 minutes and a percent acrylic acid content of about 20 percent (by weight) are suitable for formulating a wood treatment composition. Table III below lists some physical properties of EAA-1 and EAA-2 (both ethylene acrylic acid interpolymers). Although EAA resins produced by The Dow Chemical Company are used in embodiments of the invention, it should be understood that EAA copolymers from other manufacturers may also be used.

TABLE III

| Physical Properties | EAA-1, Values English (SI) | EAA-2, Values English (SI) |
|---|---|---|
| Resin Properties | | |
| Percent Comonomer[1] | 20.5 | 20.0 |
| Melt Index, g/10 min[2] | 300 | 1300 |
| Melt Flow Rate, g/10 min.[2] | 13.8 | 65.0 |

TABLE III-continued

| Physical Properties | EAA-1, Values English (SI) | EAA-2, Values English (SI) |
|---|---|---|
| Density, g/cc | 0.958 | 0.955 |
| DSC Melting Point, ° F. (° C.) | 171 (77) | 167 (75) |
| Vicat Softening Point, ° F. (° C.) | 108 (42) | 104 (40) |
| Molded Part Properties[3] | | |
| Ultimate Tensile Strength, psi (Mpa) | 1400 (10) | 900 (6.2) |
| Ultimate Elongation, percent | 390 | 350 |
| Tensile Modulus, 2% Secant, psi (MPa) | 4800 (33) | 3200 (22) |
| Hardness, Shore D | 50 | |

(1) Comonomer content measured by direct titration procedure.
(2) Melt Index values are correlated from Melt Flow Rate (ASTM D 1238 at conditions of 125° C./2.16 kg).
(3) All tests performed on compression molded samples.

Another preferred polymer that is suitable as a wood treatment composition in accordance with some embodiments of the invention is a substantially random interpolymer comprising units derived from ethylene and one or more a-olefin monomers with one or more vinyl or vinylidene aromatic monomers and/or aliphatic or cycloaliphatic vinyl or vinylidene monomers. As used herein, the term "substantially random" as it applies to preceding substantially random interpolymers, means that the distribution of the monomers of the interpolymer can be described by the Bernoulli statistical model or by a first or second order Markovian statistical model, as described by J. C. Randall in POLYMER SEQUENCE DETERMINATION, Carbon-13 NMR Method, Academic Press New York, 1977, pp. 71–78. Preferably, substantially random interpolymers do not contain more than 15 percent of the total amount of vinyl aromatic monomer in blocks of vinyl aromatic monomer of more than 3 units. More preferably, the interpolymer is not characterized by a high degree of either isotacticity or syndiotacticity. This means that in the carbon-13 NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

In some embodiments, the low molecular weight copolymers or interpolymers are substantially random olefin interpolymer comprising:

(1) first polymeric units derived from:
  (i) at least one vinyl aromatic monomer, or
  (ii) at least one aliphatic or cycloaliphatic vinyl or vinylidene monomer, or
  (iii) a combination of at least one aromatic vinyl monomer and at least one aliphatic or cycloaliphatic vinyl or vinylidene monomer, and
(2) second polymeric units derived from at least one $C_{2-20}$ α-olefin; and optionally
(3) third polymeric units derived from one or more ethylenically unsaturated polymerizable monomers other than those of (1) and (2).

The first polymeric units may be present in the interpolymer in any amount, such as from about 0.5 mol. percent to about 99.5 mol. percent, from 5 mol. percent to about 90 mol. percent; from 10 mol. percent to about 75 mol. percent; from 1 mol. percent to about 50 mol. percent; from 10 mol. percent to about 45 mol. percent; or from 5 mol. percent to about 35 mol. percent. Preferably, the first polymeric units are present in an amount of about 50 mol. percent or less. Similarly, the second polymeric unit may be present in the interpolymer in the above ranges. In some embodiments, the second polymeric units are present in an amount of about 50 mol. percent or higher. In other embodiments, the second polymeric units are present in an amount higher than the first polymeric units. The third polymeric units are optional and may be present up to about 50 mol. percent, preferably up to about 40 mol. percent, up to about 30 mol. percent, up to about 20 mol. percent, up to about 10 mol. percent, or up to about 5 mol. percent.

Suitable α-olefins include for example, α-olefins containing from 2 to about 20, preferably from 2 to about 12, more preferably from 2 to about 8 carbon atoms. Particularly suitable are ethylene, propylene, butene-1,4-methyl-1-pentene, hexene-1 or octene-1 or ethylene in combination with one or more of propylene, butene-1,4-methyl-1-pentene, hexene-1 or octene-1. These α-olefins do not contain an aromatic moiety.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

Suitable vinyl aromatic monomers which can be employed to prepare the interpolymers include, for example, those represented by the following formula:

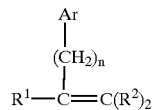

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; the two $R^2$ groups can be the same or different groups. Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary monovinyl aromatic monomers include styrene, vinyl toluene, α-methylstyrene, t-butyl styrene, chlorostyrene, including all isomers of these compounds, and the like. Particularly suitable monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as ortho-, meta-, and para-methylstyrene, the ring halogenated styrenes, para-vinyl toluene or mixtures thereof, and the like. A more preferred aromatic monovinyl monomer is styrene.

By the term "aliphatic or cycloaliphatic vinyl or vinylidene compounds", it is meant addition polymerizable vinyl or vinylidene monomers corresponding to the formula:

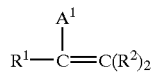

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; alternatively $R^1$ and $A^1$ together may form a ring system. Each $R^2$ is independently selected from the group of radicals consisting of hydrogen and alkyl radicals containing from 1 to about 4 carbon atoms, preferably hydrogen or methyl; the two $R^2$ groups can be the same or different groups. Preferred aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

The substantially random interpolymers can be prepared as described in EP-A-0,416,815 by James C. Stevens et al. and U.S. Pat. No. 5,703,187 by Francis J. Timmers, both of which are incorporated herein by reference in their entirety. Such a method of preparation of the substantially random interpolymers includes polymerizing a mixture of polymerizable monomers in the presence of one or more metallocene or constrained geometry catalysts in combination with various cocatalysts. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization. Additional methods are disclosed in U.S. Pat. No. 6,344,515, which is incorporated by reference herein in its entirety.

Examples of suitable catalysts and methods for preparing the substantially random interpolymers are disclosed in U.S. application Ser. No. 702,475, filed May 20, 1991 (EP-A-514,828); as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of which patents and applications are incorporated herein by reference.

As mentioned above, the wood treatment composition in accordance with embodiments of the invention may be prepared by a variety of methods. Although several methods have been described above, other methods exist. For example, a suitable polymer may be premixed with creosote, along with any desirable additives. The mixture is subsequently agitated and heated to an elevated temperature (i.e., from about 150° to about 250° F.). After a sufficient period of time of agitation at the elevated temperature, the mixture is ready for application to a wood product. Instead of premixing, a suitable polymer may be added as a melt after creosote is heated to a desired temperature. A suitable polymer may also be added to creosote as an aqueous dispersion or any other solution forms.

After a wood treatment composition is obtained, it can be applied to at least a portion of wood to prolong its service life. The wood treatment composition may be applied to a surface of wood in any manner so long as the composition forms a coating on the surface of the wood or penetrates into the wood. For example, a piece of wood may be coated by a wood treatment composition by dipping the wood into the composition in liquid form. It may also be applied to a piece of wood by spray painting. Preferably, the a uniform layer is formed on the surface of the wood. In addition to or as an alternative to the formation of a uniform coating on the surface of the wood, the wood treatment composition may penetrate into the wood to achieve the function of wood preservation. Typically, such penetration is accomplished by applying the treatment composition at high temperatures and/or high pressures to force the treatment composition into the wood. Excess creosote is typically removed under reduced pressure. Preferably, the wood treatment composition penetrates the wood to uniformly coat the cell walls of the internal wood structure.

In some embodiments, a wood treatment composition is applied to a piece of wood by pressure impregnation. Prior to pressure impregnation, wood is typically dried first. One widely employed batch drying process is the Boulton process. In this process, the green wood products to be dried are placed in a suitable treatment vessel, submerged in a coal tar based heat transfer medium and heated to an elevated temperature while gradually applying a vacuum to the vessel. The treatment of the wood products, under these conditions, is continued until such time as a predetermined amount of water inherent in the wood products, i.e., sap water, is removed therefrom. Such a process is described, for example, in U.S. Pat. No. 4,729,832, which is incorporated by reference herein in its entirety.

In pressure impregnation, dried pieces of wood are loaded into a pressure vessel. The vessel may be evacuated to remove air and moisture. A wood treatment composition may be introduced into the pressure vessel prior to or subsequent to the evacuation. Then, the pressure chamber is filled with an inert gas or air to an elevated pressure, such as from about 100 psi to about 250 psi. The pressure vessel is heated to an elevated temperature, such as from about 150° F. to about 250° F. In the pressure vessel, the wood treatment composition is contacted with the wood at the elevated temperature and pressure for a sufficient period of time, e.g., from about 1 hour to about several hours. After the impregnation process is finished, the remainder of the wood treatment composition is removed from the pressure vessel, which may then be evacuated to hold the treated wood under vacuum for a period of time, e.g., from about 10 to 30 minutes. Afterwards, the treated wood is removed from the pressure vessel and allowed to cool to room temperature. In addition to the pressure impregnation process described herein, the wood treatment composition may be used to treat wood according to the processes disclosed in U.K. Patent No. 1,354,298 and U.S. Pat. No. 4,276,329; U.S. Pat. No. 5,246,739; and U.S. Pat. No. 5,506,001. The disclosures of all of the preceding patents are incorporated by reference herein in their entirety.

The wood product obtained in accordance with the embodiments of the invention comprises a piece of wood with at least one surface treated by a treatment composition comprising a mixture of creosote and a polymer which is miscible with the creosote at about 200° F. and does not substantially phase-separate when the composition is under ambient conditions. Preferably, the entire outer surface is treated by the wood treatment composition. In some embodiments, only one or two surfaces are treated by the composition. In some preferred embodiments, the piece of wood is penetrated by the treatment composition to coat the cell walls of the internal wood structure in a substantially uniform manner. The treated wood product can be used as a railroad tie, a switch and bridge tie, a utility pole, a bridge pole, and so on.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

Testing Methods

Unless indicated otherwise, the following testing procedures are to be employed:

Density is measured in accordance with ASTM D-792. The samples are annealed at ambient conditions for 24 hours before the measurement is taken.

Bulk density is determined in accordance with ASTM D-1895 Method B by pouring the resin into a 100 ml graduated cylinder to the 100 ml line without shaking the cylinder, and weighed by difference.

Melt index ($I_2$), is measured in accordance with ASTM D-1238, condition 190° C./2.16 kg (formally known as "Condition (E)"). It should be understood that for some low molecular weight polymers their melt index could not be measured by this method due to the low molecular weight.

Tensile properties of specimens prepared according to ASTM 1708-96. Samples were prepared by compression molding a plaque from the polymer to be tested. Typically, the sample is melted at 190° C. for 3 minutes then compression molded at about 190° C. for 2 minutes under about 5.5 MPa pressure for about 2 minutes. The plaque is then allowed to cool at about 8° C./minute while still under 200 psi pressure. The molded plaque has a thickness of about 0.005 inches. The plaque is then cut into a dogbone shaped test piece using a steel rule die according to a shape in accordance with ASTM 1708-96. The dimensions of the test pieces are 2.23 cm×0.47 cm×0.13 cm. Elongation is based on a sample length of 1.91 cm. The tensile properties of the test samples were tested on an Instron 1145 Tensile Tester at a crosshead speed of 5.1 cm/minute.

Differential Scanning Calorimetry (DSC) measurements were performed on a TA Instruments 2920 DSC unit with a refrigerated cooling system unit. Samples were injected into a hot glass capillary and purged with nitrogen prior to sealing with a microtorch. The weight of the samples averaged 2.9 mg and ranged from 1.8 mg to 4.5 mg. The samples were equilibrated in the DSC to 0° C. Then the temperature was ramped at 10° C./minute to 150° C. Cooling was performed thereafter at a rate of 10° C./minute to a temperature of −30° C. Samples were then reheated at 5° C./minute to 150° C. and a second cooling was performed at a rate of 5° C./minute until the sample reached −30° C.

Optical micrographs were obtained by hot stage microscopy. Samples were prepared by adding the desired polymer to P2 creosote in any suitable container on a hot plate while stirring. After being heated and stirred, the samples were allowed to cool to room temperature. Immediately prior to analysis a sample of the mixture was removed from the container via a glass pipette and placed on a glass slide for analysis. All micrographs were recorded with a Sony DKC-5000 Digital Camera and a Nikon Eclipse E600 POL Microscope on a Mettler Toledo FP 82HT hot stage with an F P90 central processor.

Gel Permeation Chromatography (GPC) data were generated using either a Waters 150C/ALC, a Polymer Laboratories Model PL-210 or a Polymer Laboratories Model PL-220. The column and carousel compartments were operated at 140° C. The columns used were 3 Polymer Laboratories 10 micron Mixed-B columns. The samples were prepared at a concentration of 0.1 grams of polymer in 50 milliliters of 1,2,4 trichlorobenzene. The 1,2,4 trichlorobenzene used to prepare the samples contained 200 ppm of butylated hydroxytoluene (BHT). Samples were prepared by agitating lightly for 2 hours at 160° C. The injection volume used was 100 microliters and the flow rate was 1.0 milliliters/minute. Calibration of the GPC was performed with narrow molecular weight distribution polystyrene standards purchased from Polymer Laboratories. These polystyrene standard peak molecular weights were converted to polyethylene molecular weights using the following equation (as described in Williams and Ward, J. Polym. Sci., Polym. Let., 6, 621 (1968):

$$M_{polyethylene} = A \times (M_{polystyrene})^B$$

where M is the molecular weight, A has a value of 0.4316 and B is equal to 1.0. In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the $i^{th}$ fraction eluting from the GPC column. The molecular weight calculations were performed with the Viscotek TriSEC software.

Melt viscosity is determined in accordance with the following procedure using a Brookfield Laboratories DVII+ Viscometer in disposable aluminum sample chambers. The spindle used is a suitable spindle (e.g., a SC-31 hot-melt spindle), for measuring viscosities in the range of from 10 to 100,000 centipoise. A cutting blade is employed to cut samples into pieces small enough to fit into the 1 inch wide, 5 inches long sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to about 300° F., with additional sample being added until the melted sample is about 1 inch below the top of the sample chamber. The viscometer apparatus is lowered and the spindle submerged into the sample chamber. Lowering is continued until brackets on the viscometer align on the Thermosel. The viscometer is turned on, and set to a shear rate which leads to a torque reading in the range of 30 to 60 percent. Readings are taken every minute for about 15 minutes, or until the values stabilize, at which time a final reading is recorded.

In the examples below, the following polymers were mixed with a creosote: (1) EAA-1 ethylene acrylic acid polymer from The Dow Chemical Company having the properties indicated in Table III; (2) EAA-3 interpolymer with 20.0 wt. percent acrylic acid and a melt index of 1950 g/10 min. (3) ethylene vinyl acetate copolymer available from Exxon designated as ESCORENE™ ULTRA MV-02514 (see Table IV below for typical properties); (4) an ethylene vinyl acetate copolymer with about 28 wt.

percent of vinyl acetate and a melt index of 800 g/10 min. (Elvax® 205W, see Table V below); (6) an ethylene vinyl acetate copolymer with 28 wt. percent of vinyl acetate and a melt index of 400 g/10 min. (Elvax® 210W, see Table V below);

TABLE IV

ESCORENE ™ ULTRA MV-02514

Description
Escorene Ultra MV-2514 is a 14 wt. percent vinyl acetate copolymer. CAS#24937-78-8

| | Units (SI) | Typical Value[1] |
|---|---|---|
| Resin Properties | | |
| Vinyl Acetate | wt. percent | 14 |
| Melt Viscosity 190° C. | cps (mPa-sec) | 3050 (3050) |
| Wax Blend Viscosity[2] 121° C. | cps (mPa-sec) | 140 (140) |
| Density | g/cm$^3$ | 0.926 |
| Bulk Density | lb/ft$^3$ (kg/m$^3$) | 28 (449) |
| Peak Melting Temperature | ° F. (° C.) | 178 (81) |
| Peak Crystallization Temperature | ° F. (° C.) | 145 (63) |
| Refractive Index | — | 1.309 |
| Physical Properties[3] | | |
| Softening Point, R & B | ° F. (° C.) | 190 (88) |
| Tensile Strength[4] @ Break | psi (MPa) | 520 (3.6) |
| Elongation[4] @ Break | percent | 70 |

[1]Values are typical and should not be interpreted as specifications.
[2]30 percent MV 02514, 70 percent 158° F.(70° C.) melting point paraffin wax.
[3]Physical properties were determined on compression molded specimens.
[4]Tensile testing was preformed on Type IV specimens.

TABLE V

Typical Properties of Elvax ® Copolymers

| Property | Elvax ® 210 | Elvax ® 205W |
|---|---|---|
| Melt Index, g/10 min. | 400 | 800 |
| Vinyl Acetate Percent | 28.0 | 28.0 |
| Density at 23° C., kg/m$^3$ (g/cc) | 951 (0.951) | 951 (0.951) |
| Tensile Strength, MPa (psi) | 2.8 (400) | 2.6 (375) |
| Elastic Modulus, MPa (psi) | 12 (1700) | 12 (1700) |
| Softening Point, Point & Ball, ° C. (° F.) | 82 (180) | 80 (176) |

[1]Samples die cut from pressed films; gage dimensions 2.23 cm × 0.47 cm × 0.13 cm (0.87 in. × 0.187 in. × 0.050 in); crosshead speed 5.1 cm (2 in.)/min. Elongation based on sample length of 1.91 cm (0.75 in.).
[2]Modulus calculated as in ASTM D-638.

EXAMPLE 1

191 grams of P2 creosote obtained from Koppers Industries and 19 grams of EAA-2 interpolymer from The Dow Chemical Company (as described in Table III) were mixed in a 400 ml beaker with a stirrer bar on a hot plate. The mixture was slowly heated to about 164° F. At this temperature, it was observed that the polymer was still on top of the creosote. The mixture was further heated to 196° F. At this temperature, the polymer was still on top of the creosote. When the mixture was heated to 205° F., it was observed that the polymer dissolved into the creosote under agitation. After about 30 minutes, the mixture was allowed to cool down to room temperature. The mixture was a thick sludge with no visible phase separation of the polymer from the creosote.

EXAMPLE 2

In this example, an EAA-3 interpolymer with 20 wt. percent of acrylic acid and a melt index of 1950 g/10 min. was mixed with P2 creosote according to the procedure described in Example 1 except otherwise indicated. 200 grams of creosote were heated to 203° F. Then 12.76 grams of the EAA interpolymer were added to the heated creosote, and the mixture was stirred rigorously. After about 5 minutes, all of the interpolymer dissolved in the creosote. After additional 5 minutes of agitation, the mixture was cooled to room temperature. A relatively homogenous mixture was obtained. No visually identifiable phase separation was present.

EXAMPLE 3

200 grams of P2 creosote obtained from Koppers Industries were mixed with 12.68 grams of an ethylene vinyl acetate copolymer available from Exxon designated as ESCORENE™ ULTRA MV-02514 (see Table IV below for typical properties). After the mixture was heated to 200° F. and held at 250° F. for about 5 minutes, the ethylene vinyl acetate copolymer appeared to be completely dissolved by the creosote. Upon cooling to room temperature, a relatively homogenous mixture was obtained.

EXAMPLE 4

In this example, 12.67 grams of an ethylene vinyl acetate copolymer with about 28 wt. percent of vinyl acetate and a melt index of 800 g/10 min. (Elvax® 205W) were mixed with P2 creosote in a procedure similar to Example 3. Upon cooling to room temperature, a relatively homogenous mixture without substantial phase separation was obtained.

EXAMPLE 5

12.67 grams of an ethylene vinyl acetate copolymer with 28 wt. percent of vinyl acetate and a melt index of 400 g/10 min. (Elvax® 210W) were mixed with 200 grams of P2 creosote in a procedure similar to Example 4. A relatively homogenous mixture was obtained.

EXAMPLE 6

12.67 grams of an ethylene stryrene interpolymer with 28 wt. percent of styrene and a melt index of 113 g/10 min. were mixed with 200 grams of P2 creosote by a procedure similar to Example 4. The polymer dissolved in the creosote at 250° F. Upon cooling to room temperature, a relatively homogenous mixture without substantial phase separation was obtained.

EXAMPLE 7

200 grams of P2 creosote were mixed with 12.67 grams of an ethylene styrene interpolymer with 76 wt. percent of styrene and a melt index of 95 g/10 min. in a procedure similar to Example 3 except the mixture was heated to 208°

F. After 5 minutes of holding the temperature at 208° F., not all of the polymer was dissolved. After 10 minutes, all of the polymer appeared to have completely dissolved by the creosote. A relatively homogenous mixture was obtained upon cooling to room temperature.

EXAMPLE 8

In this example, two wood treatment compositions were prepared and applied to wood samples by pressure impregnation. A sample of creosote was obtained from Koppers Industries and heated to a temperature from about 176 to about 221° F. in a stirred vessel (½ gallon tin paint can). A ethylene acrylic acid interpolymer (EAA-2) resin was added to the creosote at 6 wt. percent. The polymer was observed to dissolve into the creosote, with no polymer floating on top of the creosote. The mixture was allowed to cool to room temperature. No polymer skin was visible on the mixture. Both unmodified creosote and the 6 percent mixture were used to treat hardwood samples according to the following procedure:

(1) Three dried hardwood (red oak) samples (19×9×305 mm or ¾×¾×12 in.) were loosely banded and placed into a 76.2 ml or 3 inch diameter reactor with threaded caps. One cap had a drain valve and an internal hook to hold the samples attached. The other end had a vent valve attached. The reactor was wrapped with thermostatically controlled heat tape and followed by several layers of insulation wrap. A thermocouple was attached to the external wall in the middle of the reactor;

(2) Heat the reactor to 200° F.;

(3) Evacuate the reactor to 660 mm Hg vacuum and hold for 10 minutes;

(4) Fill the reactor with creosote at 200° F.;

(5) Raise the pressure of the reactor to 150 psi using air and hold for 1 hour at 200° F.;

(6) Drain the creosote mixture from the reactor;

(7) Evacuate the reactor to 660 mm Hg vacuum and hold for 15 minutes while maintaining the temperature at 200° F.;

(8) Release the vacuum and remove the treated wood from the reactor; and (9) Allow the wood samples to cool.

The wood samples treated by unmodified creosote showed complete penetration as characterized by the black discoloration typical of creosote-treated wood. The wood samples treated by the 6 wt. percent polymer/creosote mixture showed complete penetration into the wood by the mixture. There also appeared to be a polymer skin layer on the surface of the wood.

EXAMPLE 9

In this example, viscosity data were obtained for various polymer/creosote mixtures on a Brookfield viscometer.

FIG. 1 shows viscosity curves as a function of temperature for four different samples: (1) unmodified P2 creosote from Koppers Industries; (2) P2 creosote with 6 wt. percent of EAA-2 resin; (3) P2 creosote with 8 wt. percent of EAA-2 resin; and (4) P2 creosote with 10 wt. percent of EAA-2 resin.

Figure 2:
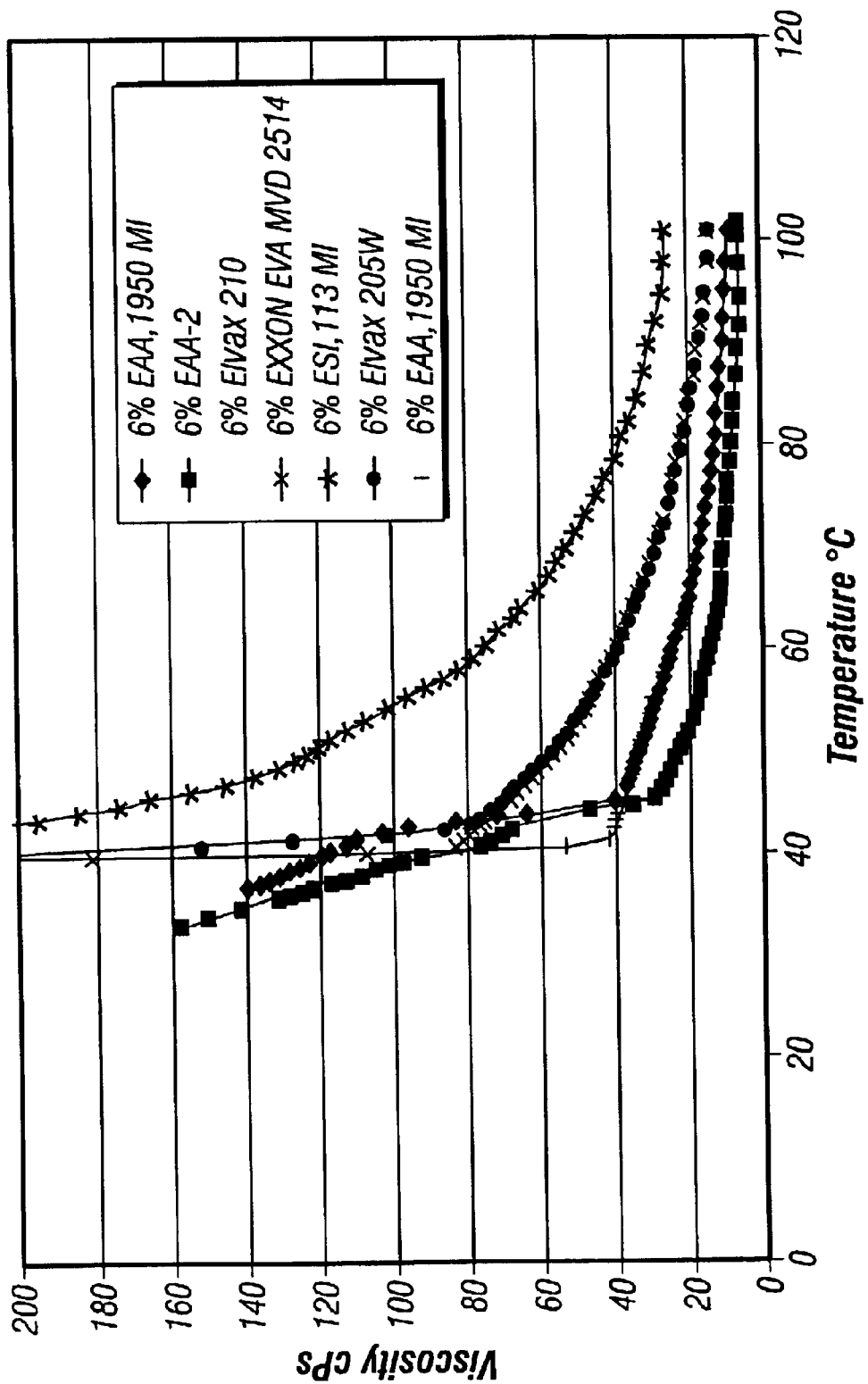
FIG. 2 shows viscosity curves as a function of temperature for polymer/creosote mixtures containing 6 wt. percent of a polymer.

FIG. 2 shows viscosity curves as a function of temperature for various polymer/creosote mixtures with 6 wt. percent of polymer. The following polymers were used: (1) EAA-3; (2) EAA-2 (see Table III); (3) Elvax® 210; (4) ESCORENE™ ULTRA EVA MV-02514 (see Table IV); (5) ESI1; (6) Elvax® 205W; and (7) EAA-1.

As described above, EAA-3 is an ethylene acrylic acid copolymer made by The Dow Chemical Company with an acrylic acid content of 20 percent and a melt index of 1950, EAA-4 is another ethylene acrylic acid copolymer made by The Dow Chemical Company with an acrylic acid content of 20 percent and a melt index of 1950; ESI is an ethylene styrene interpolymer made by The Dow Chemical Company with a styrene content of 28 wt. percent and a melt index of 113; and Elvax® 210 and Elvax® 205W are ethylene vinyl acetate copolymers available from Du Pont.

EXAMPLE 10

In this example, the water absorption by wooden stakes treated with creosote and polymer-modified creosote were assessed by weight gain and changes in the outside dimensions of the stakes.

Four oak wood stakes were prepared according the following procedure. All stakes were cut to fit into an 8 oz. graduated screw top jar. Each jar had a metal rod inserted to hold a single stake completely submerged. All stakes were dried for three days at 150° F. in an oven. After the drying period, the cut edge on each stake was sealed with the same liquid material as the entire stake had been treated. For the treatment of the cut edge, the stakes and the sealing liquid were brought to 150° F. After each stake was sealed, it was allowed to cool to room temperature. Before pressure impregnation treatment, the weight and the dimensions of each stake was measured. Stake No. 1 was used as control. Therefore, no treatment composition was applied to this sample. Stakes Nos. 2, 3, and 4 were treated by a pressure impregnation process similar to the one described in Example 8. Stake No. 2 was treated with creosote obtained from Koppers Industries. Stake No. 3 was treated with a creosote/polymer mixture with 6 wt. percent of EAA-2 ethylene acrylic acid interpolymer. Stake No. 4 was treated in the same way as stake No. 3 initially and then followed by a subsequent treatment with a EAA-2 aqueous dispersion. The aqueous dispersion included 30 percent EAA-2 resin in water with monoethanol amine. Stake 4 was coated with the aqueous dispersion of EAA-2 several weeks after the initial pressure impregnation treatment. Therefore, Stake No. 4 was intended to simulate coating a railroad tie in the field after it is installed on the track line.

After the weight and the dimensions of each stake were measured, the stakes were submerged in distilled water in their respective jars. The jars were maintained at room temperature. Every twenty-four hours, each stake was removed from its jar, dried by a paper towel, weighed, measured, and then returned to its jar. The weight and dimension data obtained from each stake are presented in Table VI below.

TABLE VI

Weight and Dimension Data

| Day | Weight (g) | LOA | AA | BB |
|---|---|---|---|---|
| Stake 1 | | | | |
| 0 | 23.17 | 3.554 | 0.749 | 0.722 |
| 1 | 28.48 | 3.659 | 0.755 | 0.739 |
| 2 | 29.66 | 3.762 | 0.777 | 0.724 |
| 3 | 31.30 | 3.762 | 0.785 | 0.748 |
| 4 | 32.31 | 3.767 | 0.790 | 0.752 |
| 5 | 33.36 | 3.768 | 0.810 | 0.753 |
| 6 | 34.40 | 3.768 | 0.819 | 0.754 |
| 7 | 35.42 | 3.769 | 0.821 | 0.754 |

TABLE VI-continued

Weight and Dimension Data

| Day | Weight (g) | LOA | AA | BB |
|---|---|---|---|---|
| Stake 2 | | | | |
| 0 | 33.71 | 3.665 | 0.742 | 0.758 |
| 1 | 37.34 | 3.770 | 0.785 | 0.763 |
| 2 | 38.21 | 3.866 | 0.787 | 0.764 |
| 3 | 39.51 | 3.865 | 0.792 | 0.769 |
| 4 | 40.14 | 3.872 | 0.802 | 0.771 |
| 5 | 41.24 | 3.873 | 0.820 | 0.776 |
| 6 | 42.15 | 3.873 | 0.822 | 0.779 |
| 7 | 42.93 | 3.874 | 0.823 | 0.781 |
| Stake 3 | | | | |
| 0 | 30.43 | 3.755 | 0.767 | 0.750 |
| 1 | 32.45 | 3.755 | 0.771 | 0.758 |
| 2 | 33.33 | 3.860 | 0.773 | 0.762 |
| 3 | 34.27 | 3.860 | 0.773 | 0.753 |
| 4 | 34.73 | 3.860 | 0.775 | 0.754 |
| 5 | 34.75 | 3.860 | 0.775 | 0.756 |
| 6 | 34.75 | 3.860 | 0.775 | 0.756 |
| 7 | 34.75 | 3.860 | 0.775 | 0.756 |
| Stake 4 | | | | |
| 0 | 33.99 | 3.775 | 0.750 | 0.809 |
| 1 | 34.93 | 3.775 | 0.762 | 0.812 |
| 2 | 35.32 | 3.779 | 0.764 | 0.814 |
| 3 | 35.87 | 3.777 | 0.764 | 0.814 |
| 4 | 35.87 | 3.777 | 0.764 | 0.814 |
| 5 | 35.87 | 3.776 | 0.764 | 0.814 |
| 6 | 35.87 | 3.777 | 0.764 | 0.814 |
| 7 | 35.87 | 3.777 | 0.764 | 0.814 |

LOA: Overall length of the stake.
AA and BB: two side measurements at the center of the stakes.

Figure 3:
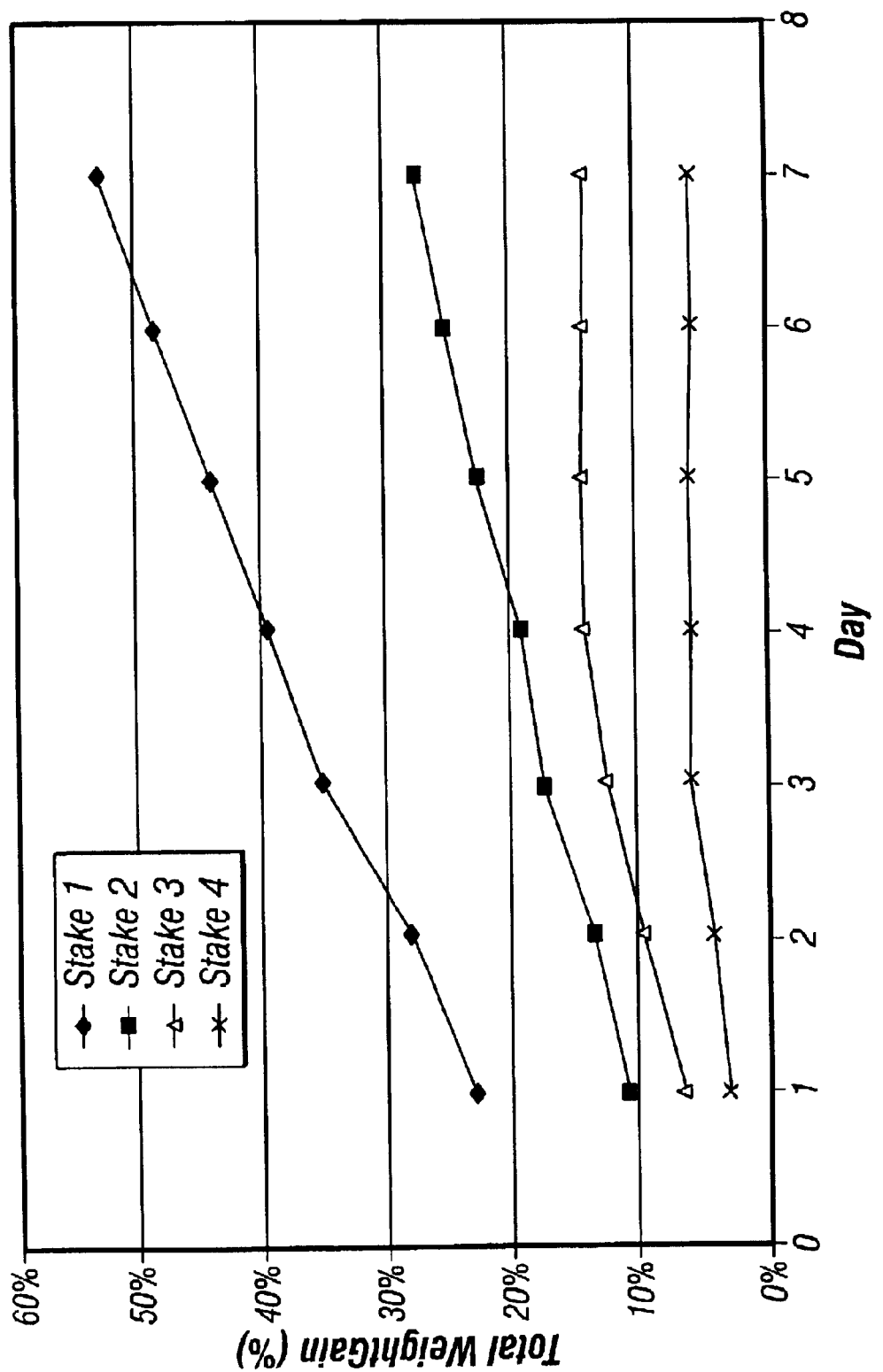
FIG. 3 is a plot of percentage weight gain for wooden stakes treated by various wood treatment compositions.

FIG. 3 is a plot of percentage weight gain as a function of time for each stake. As seen from FIG. 3, the weight gain (i.e., water absorption by the wood stake) increases as a function of time in a seven day period for the untreated stake and the creosote treated stake (i.e., stake No. 1 and stake No. 2). In contrast, the weight gain plateaus after four days for both stake No. 3 and stake No. 4. These data seem to suggest that a wood treatment composition based on polymer-modified creosote should reduce moisture penetration into wood, thereby prolonging the service life of the wood.

EXAMPLE 11

In this example, southern yellow pine wood stakes were used to assess water absorbance of wood treated with P2 creosote and a variety of P2 creosote-EAA compositions. All wood stakes were obtained from a commercially available source as an untreated 2 in.×6 in. board. Individual stakes were cut to a thickness of approximately ¼ inch with care being taken to avoid pieces having knots or other imperfections. Each stake was weighed and its dimensions measured before drying in an oven for 24 hrs at 110° C. After drying in the oven for 24 hrs, each stake was allowed to cool to room temperature before being reweighed and remeasured.

A treatment composition having 6 wt. percent was prepared by adding 500 grams of well-mixed P2 creosote and 31.9 grams of EAA-2 to a mixer. The motor of the mixer was operated at about 250 rpm while the mixture was heated to 200° F. to 205° F. and held at this temperature for 4 hours. After 4 hours the mixture was cooled and sealed until application to the individual stakes.

Other formulations for treating the southern yellow pine stakes were prepared in a corresponding manner depending on the formulation desired. Specific formulations are in recorded in Table VII.

TABLE VII

| Formulation | P2 Creosote (grams) | Resin (grams) | Borax (grams) |
|---|---|---|---|
| 6% EAA-2 | 500 | 31.9 | 0 |
| 10% EAA-2 | 488 | 55 | 7 |
| 8% EAA-5 | 500 | 43.5 | 7 |
| 10% EAA-6 | 500 | 55.5 | 3.762 |

For each formulation four individual stakes were used. Each stake was treated with the formulation in the following manner. First, a reactor was preheated to 200° F. Each stake was submerged in the heated treatment composition for 30 minutes. After the treatment period, the stakes were removed and allowed to cool to room temperature. The cooled stakes were then weighed and measured to determine the amount of treatment composition absorbed by each stake as well as changes in the dimensions of the stakes.

In another treatment formulation, southern yellow pine stakes were treated with a 20 percent dispersion of EAA-2 in water with monoethanolamine (MEA). These samples were prepared by brushing the dispersion onto one side of the stake and allowed to dry.

Average values for mass and length changes associated with the treatment of the wood stakes is recorded in TABLE VIII. An untreated control sample and a stake treated only with P2-creosote are included for comparison. The data indicate that the control sample increased in weight by about 3 percent simply from regaining moisture that was removed during the drying step. Also, each of the stakes shows a greater percentage increase in weight than that treated with the P2 creosote alone.

TABLE VIII

| Formulation | Percent Change in Overall Length (Average) | Percent Change in Mass (Average) |
|---|---|---|
| 6% EAA-2 | 0.68 | 30.2 |
| 10% EAA-2 | 0.64 | 33.6 |
| 8% EAA-5 | 0.63 | 23.1 |
| 10% EAA-6 | 0.63 | 28.5 |
| Brushed-On | 1.3 | 3.7 |

Samples were subjected to water immersion testing. Samples were immersed in water for 5 or 30 minutes to determine the effect of the treatment composition of the water absorbing characteristics of the treated pine stakes. Again each sample was measured and weighed after the immersion time was complete and at selected time intervals of storage at about 77° F. thereafter.

Results of the 5 minute water immersion testing on the treated samples as well as a control sample and a sample treated only with the P2 creosote are reported in TABLE X. The reported changes in mass are based on the oven-dried weights. These results indicate that the control sample absorbed the most water. The water was also more easily removed from this sample over time. These results also indicate that the stake treated with the brushed-on dispersion absorbed the least amount of water. The stake treated with the P2-EAA-5 mixture absorbs less water than either the P2-only treated stake or any of the other treatment compositions.

Figure 8:
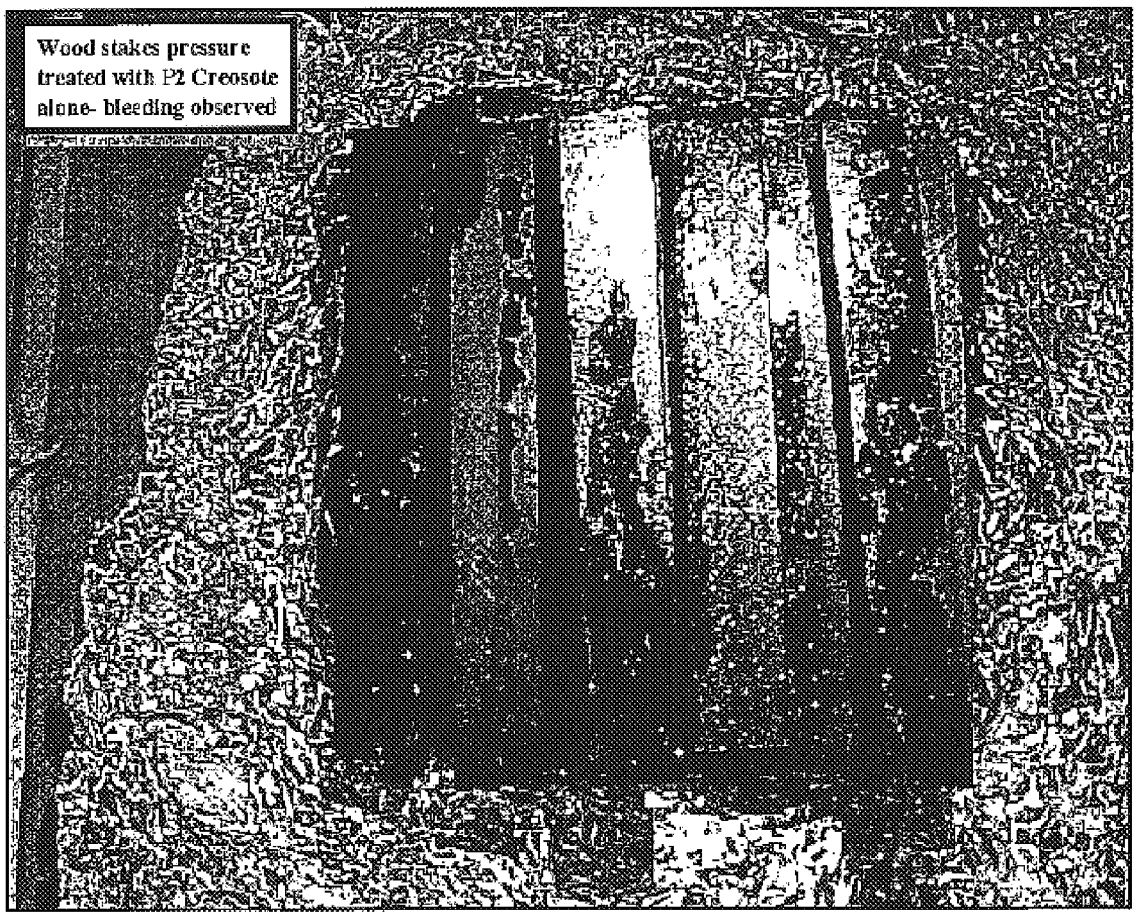
FIG. 8 shows a scanned image of wood stakes treated with P2 creosote.
Figure 9:
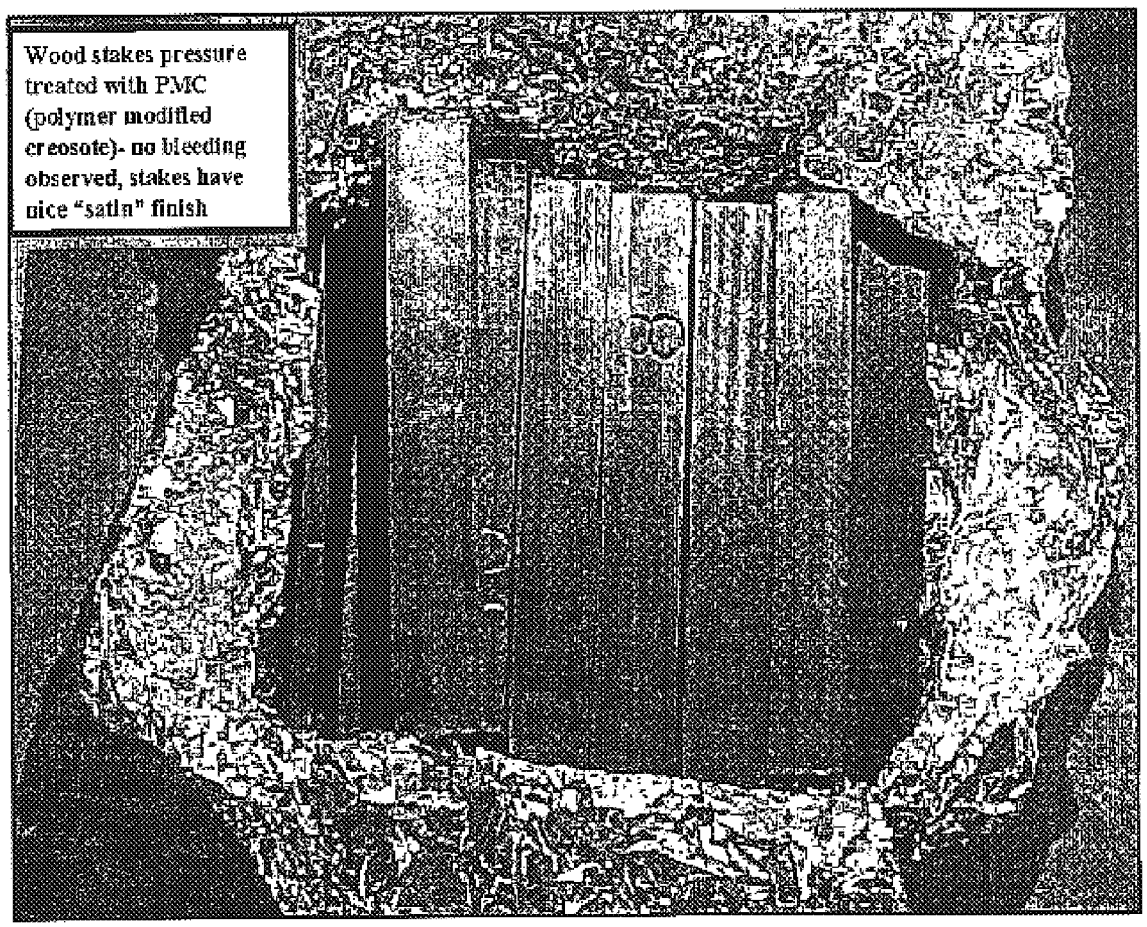
FIG. 9 shows a scanned image of wood stakes treated with an embodiments of the wood treatment compositions described herein.

FIGS. 8 and 9 compare the leaching, or "bleeding", of the creosote in wood samples. As FIG. 8 shows, conventional treatment of wood samples with creosote produces a black discoloration. FIG. 8 also shows that wood samples treated with conventional creosote tend to be coated with creosote that bleeds out of the wood, producign a sticky and undesirable wood surface. Such bleeding is also environmentally undesirable. In contrast FIG. 9 shows that samples treated with mixtures of P2 creosote and the EAA polymers described herein have substantially reduced leaching of the creosote. The samples do not have the typical black discoloration and have a smooth, satin-like finsih rather than the sticky, tar-like coating observed for the conventionally treated samples.

The 30-minute water immersion testing on the treated samples show an increased effect of the treatment compositions on water absorption. After the 5-minute immersion test, samples were oven dried and the weight recorded after cooling to room temperature. The stakes were then immersed in water for 30 minutes. The results are reported in TABLE IX. The reported percent weight changes are based on the oven dried weights. Again, the results also indicate that the stake treated with the brushed-on dispersion absorbed the least amount of water. The stake treated with the P2-EAA-5 mixture absorbs less water than either the P2-only treated stake or any of the other treatment compositions.

TABLE IX

| Formulation | 5 Min. Immersion; percent Wt. Change (Average) | 30 Min. Immersion; percent Wt. Change (Average) |
|---|---|---|
| Control | 71.2 | 66.0 |
| P2 Only | 40.3 | 12.4 |
| 6% EAA-2 | 45.0 | 7.3 |
| 10% EAA-2 | 47.1 | 5.5 |
| 8% EAA-5 | 38.0 | 9.1 |
| 10% EAA-6 | 44.5 | 7.1 |
| Brushed-On | 15.7 | 3.7 |

The results indicate that less water is absorbed on the second immersion, even when the immersion time is longer. Importantly, this may mean that stresses resulting from repeated exposures to alternately wet and dry environments are significantly reduced for southern yellow pine samples.

EXAMPLE 12

Two test samples were prepared to evaluate the effects of different polymer characteristics on the behavior of treated southern yellow pine stakes. Mixtures of P2 creosote with either 10 wt. percent EAA-6 or EAA-2 (with borax) were prepared. An untreated control sample and a sample treated with only P2 creosote were also prepared for comparison purposes. The treated stakes were oven dried and weighed before immersing in water for 30 minutes. The mass and length of each stake was recorded immediately after immersion and at various intervals for 48 hours thereafter. The percent change in mass for each sample at various times after immersion is recorded in Table X.

TABLE X

| Formulation | Average percent Change in Mass (0 hours) | Average percent Change in Mass (1 hour) | Average percent Change in Mass (4 hours) | Average percent Change in Mass (12 hours) | Average percent Change in Mass (48 hours) |
|---|---|---|---|---|---|
| Control | 66.1 | 62.2 | 41.7 | 6.8 | 1.5 |
| P2 Only | 12.4 | 10.1 | 5.0 | 2.6 | 1.9 |
| 10 percent EAA-2 (borax) | 5.5 | 4.3 | 3.3 | 2.6 | 2.1 |
| 10 percent EAA-6 | 7.1 | 5.6 | 3.7 | 2.6 | 2.1 |

The change in length as a function of time for the samples of Example 13 are recorded in Table XI. These data also indicate that mixtures of P2 and either EAA-2 or EAA-6 outperform P2 creosote alone. However, EAA-2 yields lower expansion in the water immersion testing than the mixture of P2 and EAA-6.

TABLE XI

| Formulation | Average percent Change in Length (0 hours) | Average percent Change in Length (1 hour) | Average percent Change in Length (4 hours) | Average percent Change in Length (12 hours) | Average percent Change in Length (48 hours) |
|---|---|---|---|---|---|
| Control | 5.6 | 5.7 | 5.7 | 2.4 | 0.8 |
| P2 Only | 2.3 | 3.4 | 2.1 | 1.3 | 1.2 |
| 10 percent EAA-2 (borax) | 1.2 | 1.5 | 1.2 | 1.1 | 1.0 |
| 10 percent EAA-6 | 1.5 | 1.9 | 1.4 | 1.1 | 1.0 |

EXAMPLE 13

The performance southern yellow pine stakes was tested with mixtures creosote and 10 wt. percent of either EAA-1 or EVA800MI. The stakes were oven-dried and treated with the respective mixtures. After treatment, the stakes were subjected to the 30 minute immersion test in water, dried and reweighed. The changes in mass and length as a function of time are recorded in Table XII and Table XIII.

TABLE XII

| Formulation | percent Change in Mass (0 hours) | percent Change in Mass (1 hour) | percent Change in Mass (4 hours) | percent Change in Mass (8 hours) | percent Change in Mass (18 hours) |
|---|---|---|---|---|---|
| 10 percent EAA-1 | 55.1 | 53.3 | 52.0 | 52.0 | 48.8 |
| 10 percent EVA800MI | 63.0 | 58.8 | 56.6 | 56.4 | 56.0 |

TABLE XIII

| Formulation | percent Change in Length (0 hours) | percent Change in Length (1 hour) | percent Change in Length (4 hours) | percent Change in Length (8 hours) | percent Change in Length (18 hours) |
|---|---|---|---|---|---|
| 10 percent EAA-1 | 3.7 | 3.2 | 2.8 | 2.8 | 1.7 |
| 10 percent EVA800MI | 3.7 | 3.8 | 3.2 | 3.1 | 2.1 |

Weight changes are greater for the samples treated with P2 creosote and either 10 percent EAA-1 or 10 percent EVA800MI than for any other treated sample, including those treated with P2 creosote alone. The sample treated with 10 percent EAA-1 gained less weight than the sample treated with the EVA800MI polymer. Thus, the samples treated with EAA1 appear to outperform those treated with EVA800MI.

EXAMPLE 14

Figure 4:
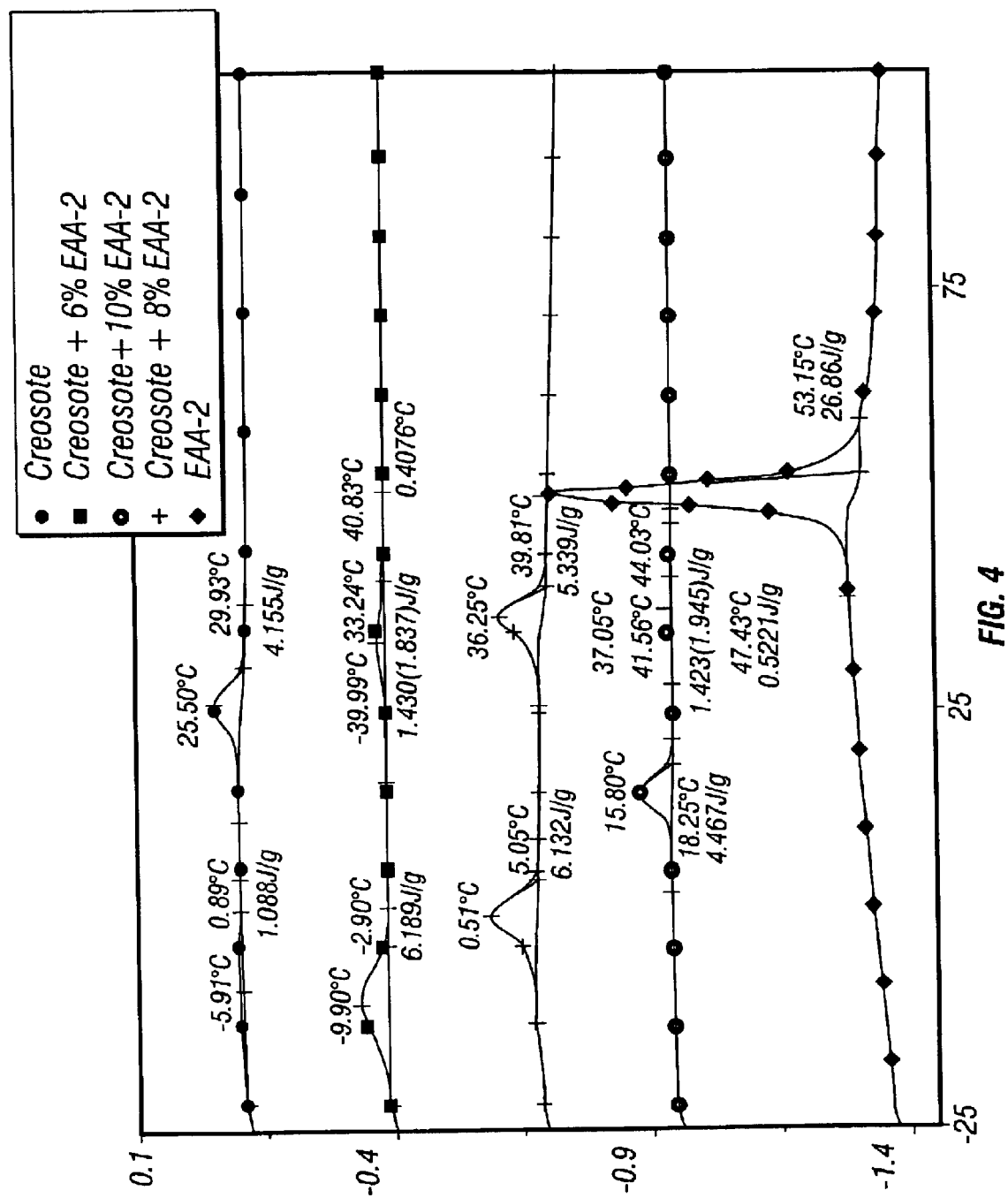
FIG. 4 shows Differential Scanning Calorimetry (DSC) traces illustrating the effect of the polymer on the crystallization temperature of polycyclic aromatic compounds in the creosote.
Figure 5A:
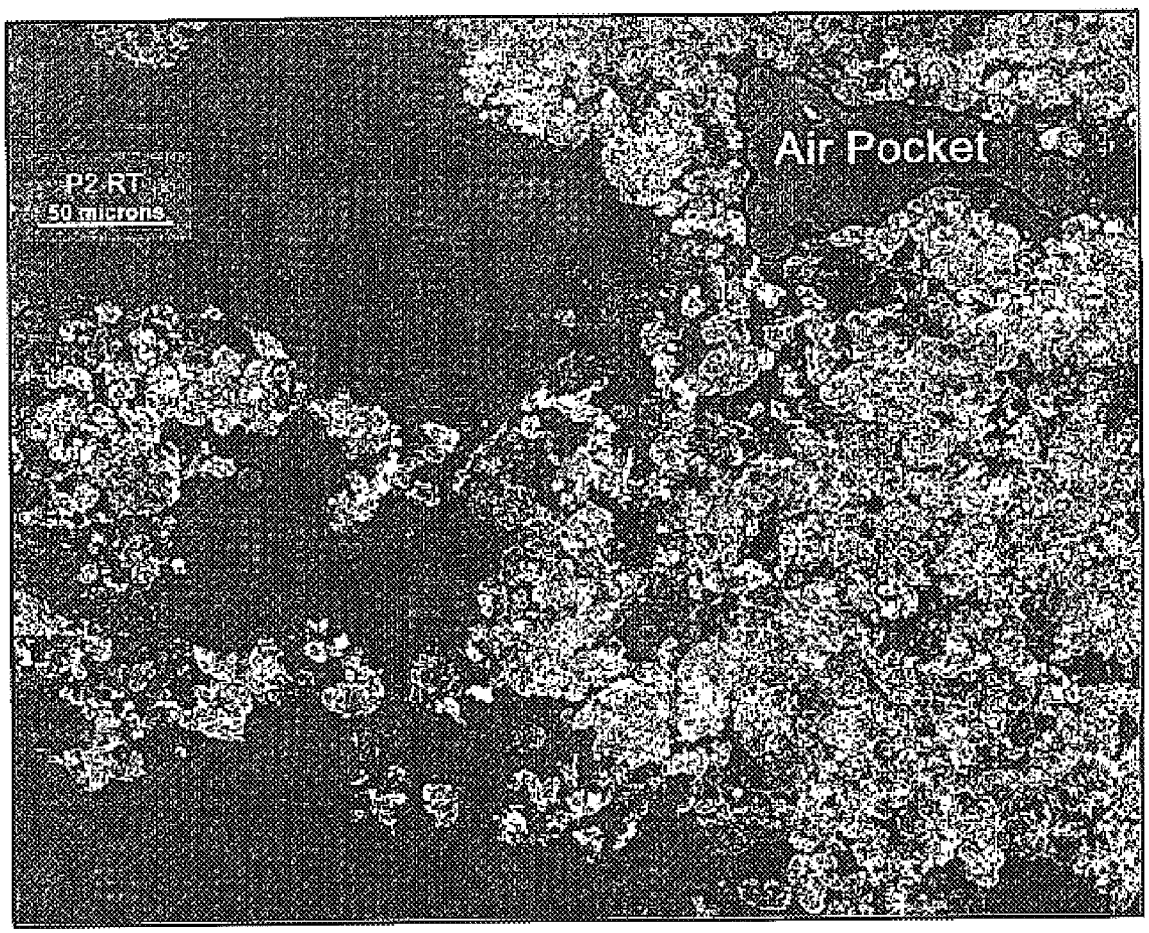
FIG. 5A shows a magnified image of a mixture of P2 creosote having crystallized polycyclic aromatic compounds.
Figure 5B:
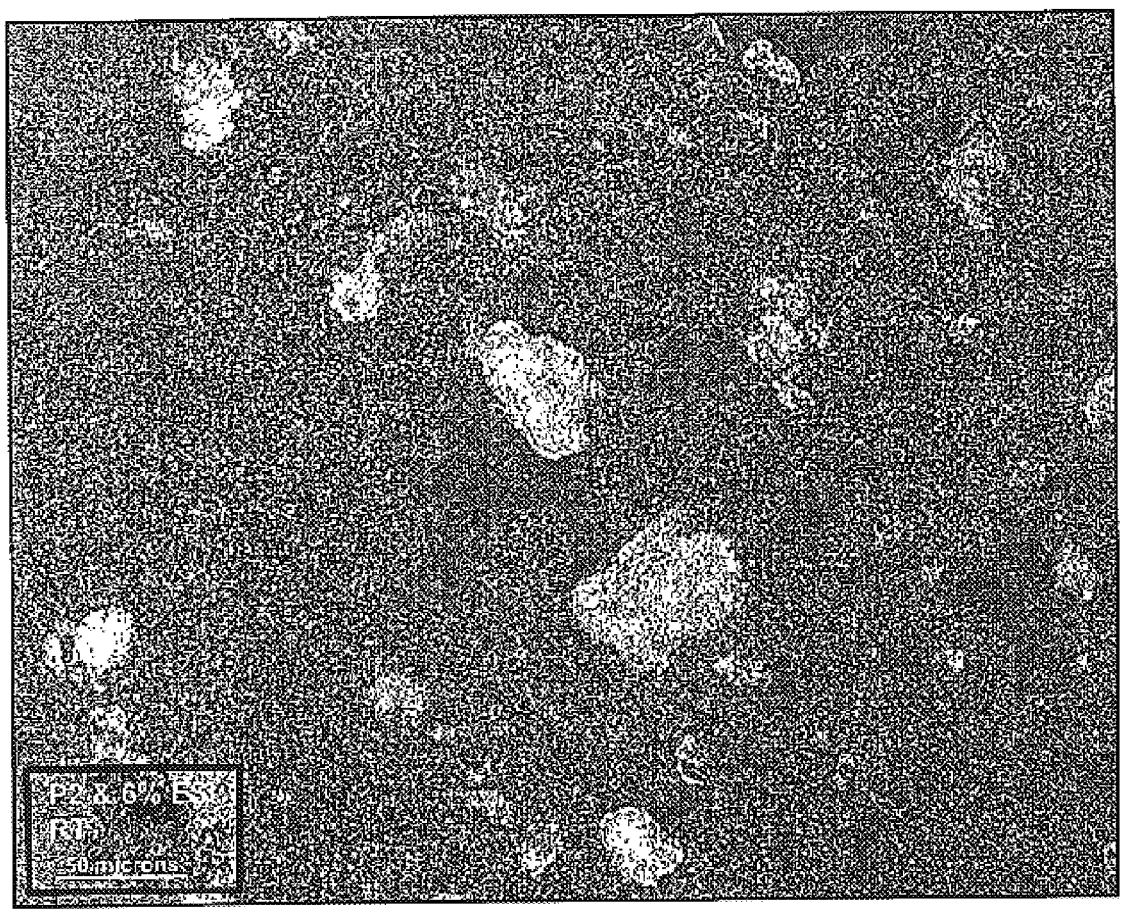
FIG. 5B shows a magnified image of a mixture of P2 creosote and an ethylene styrene interpolymer.
Figure 5C:
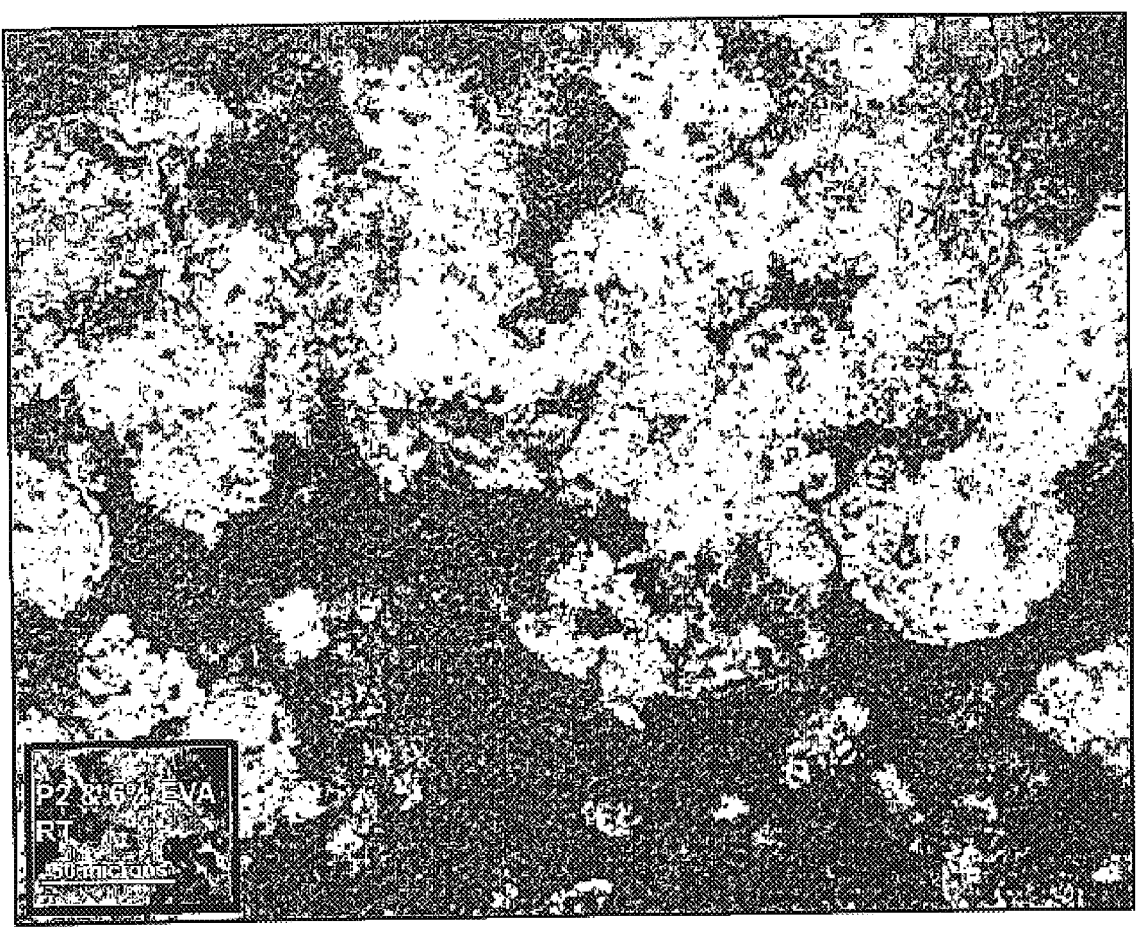
FIG. 5C shows a magnified image of a mixture of P2 creosote and an ethylene vinyl acetate copolymer.
Figure 5D:
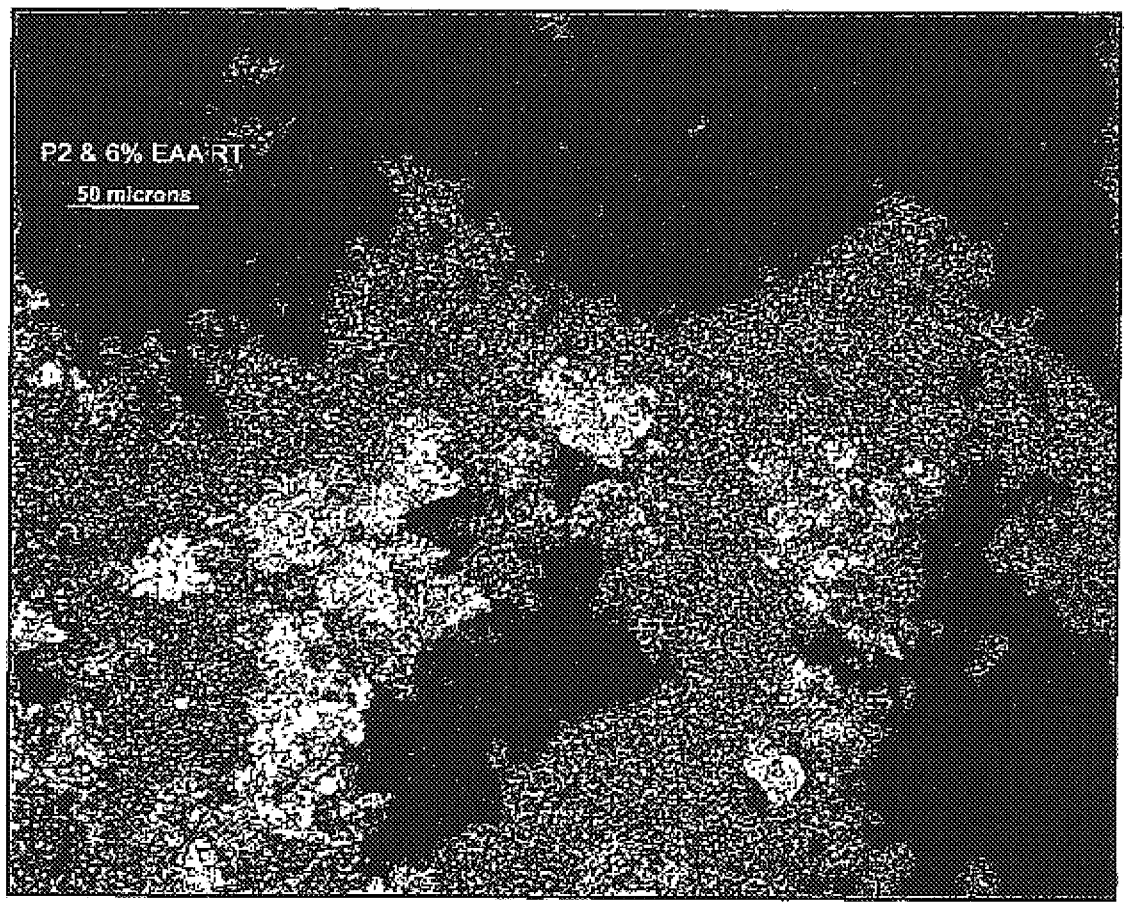
FIG. 5D shows a magnified image of a mixture of P2 creosote and an ethylene acrylic acid copolymer.

In another set of experiments, the effect of polymers on the characteristic crystallization temperature of polycyclic aromatic compounds in the creosote was examined by Differential Scanning Calorimetry. FIG. 4 shows a comparison of the crystallization temperature of polycyclic aromatic compounds in different compositions. As FIG. 4 indicates, the crystallization temperature of the polycyclic aromatic compounds in the creosote is about 30° C. FIG. 4 also indicates that the crystallization temperature of EAA-2 is about 53° C. Mixtures containing creosote and EAA-2 have a reduced crystallization temperature of the creosote and the crystallization temperature of the polymer. For example, the DSC trace of a mixture comprising about 6 wt percent EAA-2 in creosote has a crystallization temperature of the polycyclic aromatic compounds of about −2.9° C. while the crystallization temperature of the polymer is reduced to about 41° C. A mixture of creosote having about 8 wt. percent of the polymer has a crystallization temperature of polycyclic aromatic compounds of about 5° C. The crystallization temperature of the polymer in this sample is about 40° C. In a mixture of about 10 percent EAA-2 in creosote, the crystallization temperature of the polycyclic aromatic compounds is about 18° C. and the crystallization temperature of the polymer is about 44° C. These data show that the measured properties do not follow the rule that indicates properties can be predicted from the weighted averaged properties of the individual components.

Regardless, in each of the mixtures having creosote and polymer, the crystallization temperature, $T_2$, of the polycyclic aromatic compounds in the mixture is lower than their crystallization temperature, $T_1$, in the creosote alone. Depending on the polymer and type of creosote in some embodiments, $T_1$ is about 10° C. to about 40° C. greater than $T_2$. In other embodiments, $T_1$ is about 15 to about 25° C. greater than $T_2$. In some embodiments, where a crystalline or semicrystalline thermoplastic polymer is used the crystallization temperature, $T_3$, of the polymer before combining with the creosote is greater than the crystallization temperature, $T_4$, of the polymer in the mixture. In some embodiments, $T_3$ is about 5° C. to about 20° C. greater than $T_4$.

FIG. 5 shows another method for characterizing some mixtures of creosote and thermoplastic polymers described herein. FIG. 5A is a magnified image of creosote at room temperature. The light areas are crystallized polycyclic aromatic compounds in the creosote. Thus, FIG. 5A indicates that at room temperature, creosote has relatively large domains of crystallized polycyclic aromatics. FIG. 5B shows a micrograph of a mixture of creosote and about 6 wt. percent ethylene styrene interpolymer is represented in FIG. 5D. This mixture also has substantially smaller crystalline domains with reduced crystallinity as judged from the gray appearance or the regions. FIG. 5C is a micrograph of a mixture of creosote and about 6 wt. percent ethylene vinyl acetate copolymer. While this micrograph shows regions of crystalline materials, their darker character indicates that the crystallinity of the regions is not as high as the crystalline regions of creosote or that the substantially smaller crystalline regions have agglomerated. A sample prepared with creosote and about 6 wt. percent ethylene acrylic acid copolymer is represented in FIG. 5D. In this image the crystalline regions are substantially smaller than those of the creosote alone. This mixture also has substantially smaller crystalline domains with reduced crystallinity as judged from the gray appearance or the regions. These polymers appear to have an affinity for the polycyclic aromatic compounds in the creosote that appears to disrupt the ordering of such compounds in the mixtures and more evenly dispersion the polycyclic aromatics throughout the mixture.

Figure 6:
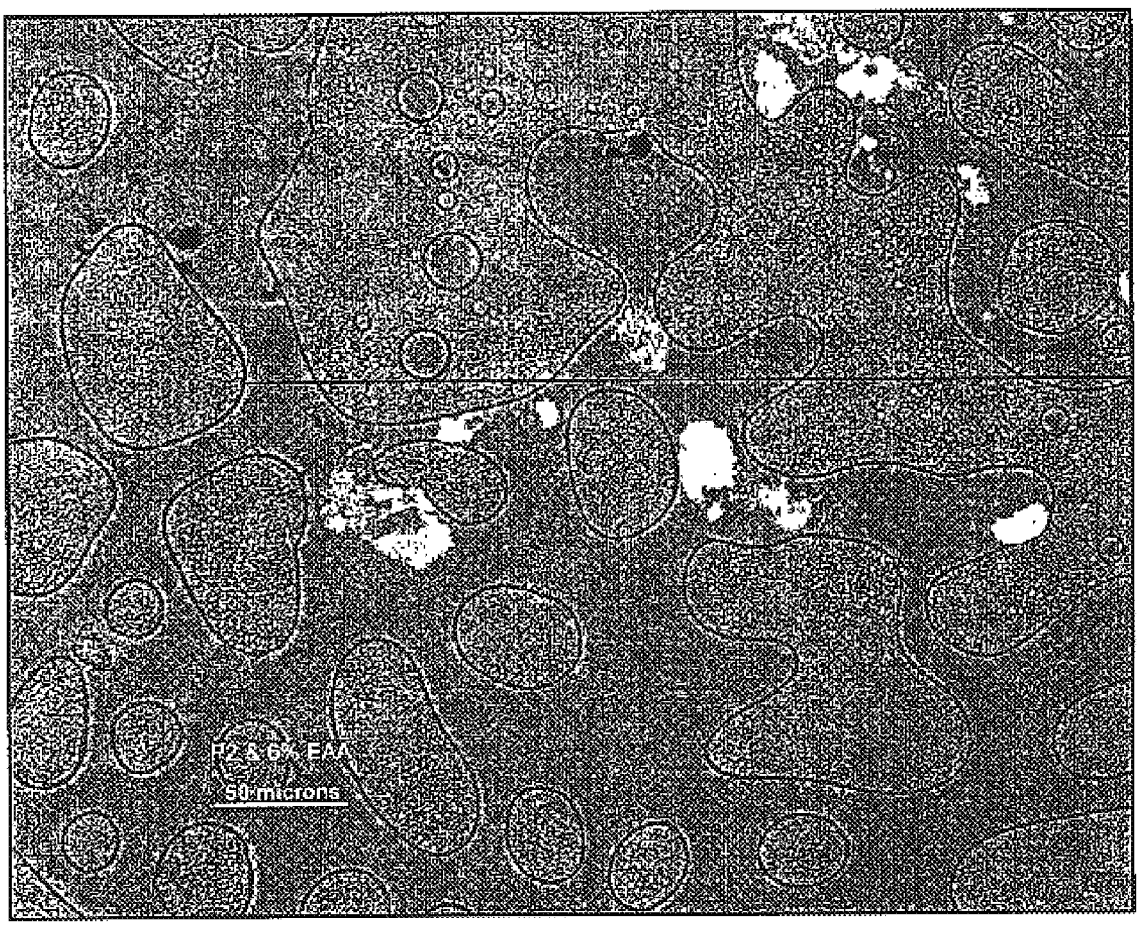
FIG. 6 shows a magnified image of P2 creosote with 6 percent ethylene acrylic acid copolymer FIG. 7 show a magnified image of P2 creosote with 6 percent ethylene styrene interpolymer.

FIG. 6 is an optical higher magnification micrograph of a mixture of creosote with about 6 wt. percent ethylene acrylic acid copolymer mixed therein. As FIG. 6 indicates there are relatively large regions of different phases. Thus, FIG. 6 may suggest that some ethylene acrylic acid polymers have a relatively low solubility in creosote.

Figure 7:
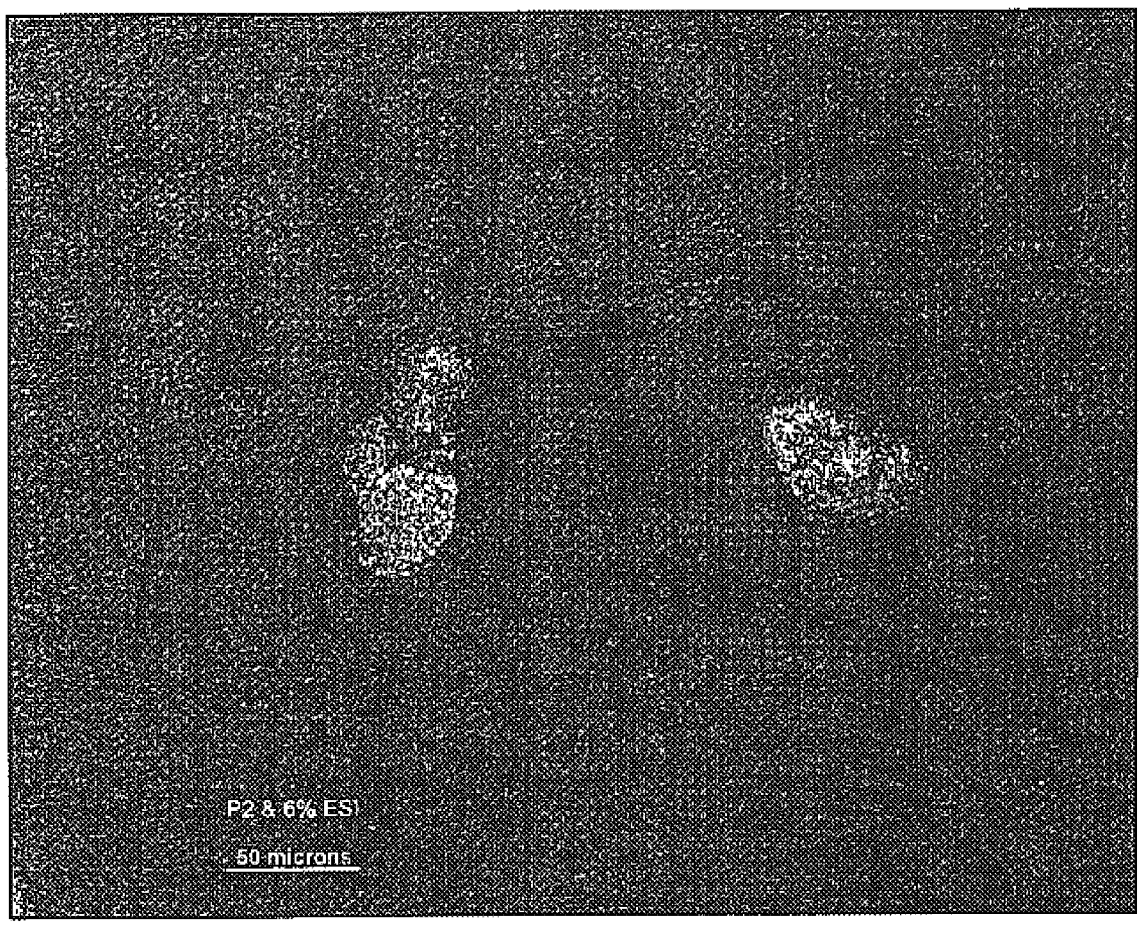

On the other hand, FIG. 7 is an optical micrograph at the same magnification as that of FIG. 6. However, the mixture of FIG. 7 is creosote with about 6 wt. percent of an ethylene styrene interpolymer. As FIG. 7 indicates, the mixture is relatively homogeneous, suggesting that not only is the crystallinity of polycyclic aromatic compounds reduced in such mixtures but also indicating that some ethylene styrene interpolymers are relatively soluble in creosote. It is believed that the styrene present in the copolymer interacts well with the aromatic rings of the polycyclic aromatic compounds, thereby increasing its solubility and reducing crystallinity of the polycyclic aromatics.

As demonstrated above, embodiments of the invention provide a wood treatment composition and a method of making and using the wood treatment composition. The wood treatment composition exhibits better moisture repellency than that of creosote. The composition should reduce the loss of creosote due to thermal bleeding and/or water exposure. Therefore, wood treated in accordance with embodiments of the invention should have longer service life than those treated with creosote. Because the predominant component in the wood treatment composition is creosote, it is relatively cost effective to use such a composition on a large scale. In some embodiments, the invention provides for compositions that substantially reduce the crystallization of polycyclic aromatic compounds in creosote. Thus, such compositions have reduced precipitation of the polycyclic aromatic compounds during shipping. Other characteristics and advantages provided by embodiments of the invention are apparent to those skilled in the art.

While the invention has been described with respect to a limited number of embodiments, the specific features of one embodiment should not be attributed to other embodiments of the invention. No single embodiment is representative of all aspects of the inventions. In some embodiments, the compositions may include numerous compounds not mentioned herein. In other embodiments, the compositions do not include, or are substantially free of, any compounds not enumerated herein. Variations and modifications from the described embodiments exist. For example, in treating wood, creosote and a suitable polymer may be applied to the wood sequentially. In other words, creosote may be applied to the wood first, and the polymer is then applied to the creosote treated wood. Conversely, a polymer may be applied to wood first, followed by creosote treatment. Although coal tar creosote is a common form of creosote used in the industry, any creosote may be used in embodiments of the invention. Most embodiments of the invention are described with reference to one polymer mixed with creosote, this does not preclude the use of two or more polymers in a wood treatment composition. It is entirely possible and feasible to mix creosote with a blend of two or more polymers to make a wood treatment composition. The method of making and using the wood treatment composition is described as comprising a number of acts or steps. These steps or acts may be practiced in any sequence or order unless otherwise indicated. In some embodiments, creosote is used as is. However, it is possible to use an emulsified form of creosote in embodiments of the invention. Similarly, emulsified wood treatment compositions may also be made according to techniques known or unknown in the art. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A wood treatment composition, comprising: a mixture of creosote and a thermoplastic polymer having a melting point or a glass transition temperature below about 210.degree. F. which is miscible with the creosote at about 200° F. and does not substantially phase-separate when the wood treatment composition is under ambient conditions, and the creosote is present in an amount of at least 50 percent by weight of the composition.

2. The wood treatment composition of claim 1, wherein the polymer has a melt index higher than about 50 g/10 min.

3. The wood treatment composition of claim 1, wherein the polymer has a melt index higher than about 200 g/10 min.

4. The wood treatment composition of claim 1, wherein the polymer has a melt index higher than about 300 g/10 min.

5. The wood treatment composition of claim 1, wherein the polymer is an ionomer.

6. The wood treatment composition of claim 1, wherein the polymer is an ethylene acrylic acid copolymer with a melting pointing below about 210° F. and a melt index higher than about 200 g/10 min.

7. The wood treatment composition of claim 6, wherein the ethylene acrylic acid copolymer is added to the creosote as an aqueous dispersion.

8. The wood treatment composition of claim 1, wherein the polymer is an ethylene methyl acrylate copolymer.

9. The wood treatment composition of claim 1, wherein the polymer is an ethylene butyl acrylate copolymer.

10. The wood treatment composition of claim 1, wherein the polymer is an ethylene styrene interpolymer.

11. The wood treatment composition of claim 1, wherein the polymer is an ethylene methyl methacrylic acid copolymer.

* * * * *